(12) United States Patent
Zhou et al.

(10) Patent No.: US 12,017,714 B2
(45) Date of Patent: Jun. 25, 2024

(54) ACTIVE-PASSIVE DIFFERENTIAL SERIES-PARALLEL CONNECTION SUPPORTING LEG, GRAVITY-BASED CLOSING SERIES-PARALLEL CONNECTION SUPPORTING LEG, AND SIX-DEGREE-OF-FREEDOM POSITION-ADJUSTING ROBOT PLATFORM

(71) Applicant: Yanshan University, Qinhuangdao (CN)

(72) Inventors: Yulin Zhou, Qinhuangdao (CN); Lihui Zhao, Qinhuangdao (CN); Hongpeng Chu, Qinhuangdao (CN); Yi Liu, Qinhuangdao (CN); Shuyang Shi, Qinhuangdao (CN)

(73) Assignee: VANSHAN UNIVERSITY, Qinhuangdao (CN)

( * ) Notice: Subject to any disclaimer, the term of this patent is extended or adjusted under 35 U.S.C. 154(b) by 630 days.

(21) Appl. No.: 17/361,465

(22) Filed: Jun. 29, 2021

(65) Prior Publication Data

US 2021/0323621 A1 Oct. 21, 2021

Related U.S. Application Data

(63) Continuation of application No. PCT/CN2020/105462, filed on Jul. 29, 2020.

(30) Foreign Application Priority Data

Aug. 15, 2019 (CN) .......................... 201910754164.6
Aug. 15, 2019 (CN) .......................... 201910754171.6

(51) Int. Cl.
*B62D 61/06* (2006.01)
*B60G 17/015* (2006.01)
(Continued)

(52) U.S. Cl.
CPC .......... *B62D 61/06* (2013.01); *B60G 17/015* (2013.01); *B60K 1/02* (2013.01); *B62D 5/0403* (2013.01);
(Continued)

(58) Field of Classification Search
CPC .... B62D 61/06; B62D 5/0403; B62D 5/0418; B62D 61/02; B62D 61/10; B62D 7/04;
(Continued)

(56) References Cited

U.S. PATENT DOCUMENTS

| | | | |
|---|---|---|---|
| 10,717,324 B2* | 7/2020 | Plate | B60B 33/04 |
| 11,701,920 B2* | 7/2023 | Mori | B62B 5/004 16/35 R |

(Continued)

FOREIGN PATENT DOCUMENTS

| | | | | |
|---|---|---|---|---|
| CN | 203460970 U | * | 3/2014 | |
| CN | 206106911 U | * | 4/2017 | |
| CN | 106945467 A | * | 7/2017 | ......... B60B 33/0042 |

*Primary Examiner* — Drew J Brown
(74) *Attorney, Agent, or Firm* — IPRO, PLLC

(57) ABSTRACT

An active-passive differential series-parallel connection supporting leg, a gravity-based closing series-parallel connection supporting leg, and a six-degree-of-freedom position-adjusting robot platform are provided. The six-degree-of-freedom position-adjusting robot platform is formed of a plurality of legs distributed in parallel, and includes a frame, a distributed controller, and multi-chain parallel legs, wherein a plurality of legs are fixedly connected with the frame through a base. The present disclosure integrates an omnidirectional movement and position adjustment to solve problems that the existing position-adjusting platform is fixed or moved inflexibly, the structure is over complicated, the occupation space is excessive, and the movement error is large, and thereby effectively expanding application range of the six-degree-of-freedom position-adjusting robot platform.

10 Claims, 17 Drawing Sheets

(51) Int. Cl.
*B60K 1/02* (2006.01)
*B62D 5/04* (2006.01)
*B62D 61/02* (2006.01)
*B62D 61/10* (2006.01)

(52) U.S. Cl.
CPC ........... *B62D 5/0418* (2013.01); *B62D 61/02* (2013.01); *B62D 61/10* (2013.01); *B60G 2300/37* (2013.01); *B60G 2500/32* (2013.01)

(58) Field of Classification Search
CPC .. B62D 63/02; B60G 17/015; B60G 2300/37; B60G 2500/32; B60K 1/02; B60K 1/00; B60K 17/165; B60K 17/303; B60Y 2200/80; B66F 9/063; B66F 9/07568
See application file for complete search history.

(56) References Cited

U.S. PATENT DOCUMENTS

| | | | |
|---|---|---|---|
| 2007/0080000 A1* | 4/2007 | Tobey | B60B 27/0047 |
| | | | 180/21 |
| 2018/0099555 A1* | 4/2018 | Yang | B62D 7/026 |
| 2019/0193784 A1* | 6/2019 | Wach | B60B 33/0049 |
| 2021/0094349 A1* | 4/2021 | Aubin | B60B 33/0068 |

* cited by examiner

ACTIVE-PASSIVE DIFFERENTIAL SERIES-PARALLEL CONNECTION SUPPORTING LEG, GRAVITY-BASED CLOSING SERIES-PARALLEL CONNECTION SUPPORTING LEG, AND SIX-DEGREE-OF-FREEDOM POSITION-ADJUSTING ROBOT PLATFORM

TECHNICAL FIELD

The present disclosure relates to the technical field of heavy-load equipment docking and assembling auxiliary equipment, in particular to an active-passive differential series-parallel connection supporting leg, a six-degree-of-freedom position-adjusting robot platform and a gravity-based closing series-parallel connection supporting leg.

BACKGROUND

In the field of heavy-load equipment such as airplanes, ships, electric power and the like, products of the equipment are generally assembled by a plurality of parts, so that the parts are often required to be butted and assembled in the production process. However, since size and mass of the parts in the heavy industry field are large, auxiliary carrying and assembling cannot be directly operated by man power but can be carried out by means of a six-degree-of-freedom position-adjusting robot platform.

The existing six-degree-of-freedom position-adjusting robot platform can be divided into a wheel type carrying vehicle and a Mecanum wheel carrying vehicle. In general, the wheel type carrying vehicle and the Mecanum wheel carrying vehicle only have three freedom degrees of planar movement and rotation around a normal of a loading platform thereof, and cannot realize spatial six-degree-of-freedom position adjustment of the parts, so that a problem that two parts cannot be butted often occurs in the process of docking the parts.

In the prior art, for example, a patent document (publication No. CN109231065A) discloses a six-degree-of-freedom position-adjusting system based on an omnidirectional moving module, which combines a parallel mechanism with the vehicle body, and in which a multi-degree-of-freedom parallel position-adjusting mechanism is mounted to a carrying vehicle, thereby realizing six-degree-of-freedom position adjustment of the carrying vehicle. By mounting the multi-degree-of-freedom parallel position adjusting mechanism to the vehicle body, the six-degree-of-freedom position adjustment of the parts can be realized; however, the added parallel mechanism greatly increases the height of the carrying vehicle, reduces the trafficability of the carrying vehicle, and thus cannot finish the docking and assembling of the equipment within a lower space; and since the position-adjusting system consisting of the carrying vehicle and the parallel mechanism essentially has two independent systems, motion errors generated by the carrying vehicle and the parallel mechanism in the working process are mutually accumulated, so as to reduce the motion precision of a terminal end of the six-freedom-degree position-adjusting platform, thereby being harmful for the highly precious docking and assembling of the parts.

SUMMARY

To solve the problems existed in the prior art, an object of the present disclosure is to provide an active-passive differential series-parallel connection supporting leg, a gravity-based closing series-parallel connection supporting leg and a six-degree-of-freedom position-adjusting robot platform, which belong to the technical field of heavy-load large part docking and assembling operation equipment, being an active differential or passive differential series-parallel supporting leg and a six-degree-of-freedom position-adjusting robot platform suitable for a low space; the omnidirectional motion and the position adjustment are integrated through the active-passive differential series-parallel connection supporting legs and the six-freedom-degree position-adjusting robot platform, to solve the problems of the existing position-adjusting platform, such as immobilization or motion inflexibility, excessively complex structure, excessively large occupied space and large motion error, and effectively expand the application range of the six-freedom-degree position-adjusting platform.

The active-passive differential series-parallel connection supporting leg of the present disclosure includes a base, a steering table, a lifting table, a wheel seat, wheels and a motor reduction transmission system, in which the steering table is rotationally connected with the base to form a rotating pair Rz; the lifting table is slidably connected with the steering table to form a moving pair Pz, and the moving pair Pz is an active pair and is driven by a linear driver; the wheel seat is rotationally connected with the lifting table to form a rotating pair Rx, belonging to a passive pair; the wheels include a first wheel and a second wheel which are respectively positioned at two sides of the rotating pair Rx, and the first wheel is rotationally connected with the wheel seat to form a rotating pair Ry1; the second wheel is rotatably connected with the wheel seat to form a rotating pair Ry2, and the first wheel and the second wheel are independently driven by two motor reduction transmission systems, respectively. The first wheel and the second wheel form synchronous driving or active differential mechanism driving, or a single motor driving differential bevel gear mechanism realizes synchronous driving or passive differential driving.

The six-degree-of-freedom position-adjusting robot platform is constructed in a multi-leg distribution parallel connection mode, and specifically includes a frame, a distributed controller and a plurality of chain parallel connection legs (i.e., three legs, four legs or six legs), wherein the plurality of supporting legs are fixedly connected with the frame through a base, the rotating pairs Rz of the supporting legs are parallel to each other, and guide rails of the moving pairs Pz of the supporting legs are parallel to each other; the supporting legs of the six-degree-of-freedom position-adjusting robot platform with three-supporting-leg are distributed in a triangular manner; the supporting legs of the six-degree-of-freedom position-adjusting robot platform with the four supporting legs are arranged in a square or rectangular or diamond layout; the supporting legs of the six-degree-of-freedom position-adjusting robot platform are arranged in a " H " ("Two stacked squares") shape.

The present disclosure also provides a gravity-based closing series-parallel connection supporting leg, which is a series-parallel connection supporting leg suitable for the low space and a six-degree-of-freedom omnidirectional mobile precision position-adjusting platform, which solves the problems of the existing position-adjusting platform, excessive height, separation of omnidirectional motion and precise posture adjustment movement, complex system (i.e., discontinuous operation), and large movement error, and effectively expand the application range of a mobile position-adjusting platform.

The technical solution of the present disclosure is proposed as follows: an active-passive differential series-parallel connection supporting leg includes a base, a steering table, a lifting table, a wheel seat, wheels and a steering motor, wherein the steering table is rotatably connected to the base through a turntable bearing; gear teeth are arranged on the periphery of the turntable bearing; the steering motor is arranged in the base, and a driving gear on an output shaft of the steering motor is matched with the gear teeth to rotate and position the steering table; the lifting table is provided with a guide rail, the steering table is provided with a sliding block, the lifting table is fixedly connected with a lifting motor; the lifting motor drives a linear driver to move through the transmission of the synchronous belt, so as to drive the sliding block to be matched with the guide rail such that the lifting table is slidably connected with the steering table; the wheel seat is rotatably connected with the lifting table, and a swing bearing is arranged at a rotating connection of the wheel seat and the lifting table; each of the wheels is rotationally connected to the wheel seat; the base is provided with a contracting brake or a clutch so as to control and lock the steering table to prevent the steering table from rotating relative to the base; the base is further provided with an angle sensor that is connected with a detection gear for detecting a rotation angle of the steering table relative to the base.

Preferably, the linear driver includes a nut, a screw rod, a lifting motor, a bearing seat and a sychronous belt, wherein the nut is fixedly connected with the steering platform; the bearing seat is arranged each of the ends of the screw rod; the bearing seat is fixedly connected with the lifting table; and the lifting motor drives the movement of the screw rod by the synchronous belt to realize the lifting of the lifting platform.

Preferably, the lifting motor is fixedly connected to the lifting platform, an output shaft of the lifting motor is connected with a active pulley, the movement of the driven pulley is driven by the synchronous belt, and the driven pulley is connected with an input end of the linear driver (i.e., the screw rod). That is to say, the driven pulley is fixedly connected with the input end of the screw rod.

Preferably, a first wheel bearing is disposed at a rotary connection between the first wheel and the wheel seat, and a second wheel bearing is disposed at a rotary connection between the second wheel and the wheel seat.

Preferably, when the parallel-series connection leg is a drive leg, at least one of the first wheel and the second wheel is an active wheel, or both of the wheels are active wheels.

Preferably, the rotational movement of the first wheel and the second wheel are respectively driven by the walking double-motor decelerator through an active differential drive or indirectly driven by the walking single-motor through a differential wheel train.

Preferably, the differential wheel train includes a first bevel gear fixedly connected with the first wheel, a second bevel gear fixedly connected with the second wheel, and a planetary bevel gear simultaneously meshed with the first bevel gear and the second bevel gear, wherein the planetary bevel gear is hinged on a planet carrier which is fixedly connected with one end face of a bull bevel gear; the bull bevel gear is rotationally connected with the wheel seat; the bull bevel gear is driven by a pinion gear meshed therewith; and the pinion gear is fixedly connected with the output shaft of the walking single-motor.

Preferably, two rotating pairs are symmetrically disposed at a position perpendicular to axes of the first wheel or second wheel. Two rotating pairs are coincident with an output axis of the walking single-motor on the outer shell of the differential wheel train. The wheel seat is rotationally connected with the lifting platform to form a rotating pair Rx.

Preferably, an independent suspension is arranged between the lifting platform and the steering platform, and the independent suspension connects the lifting platform and the steering platform; the independent suspension consist of a suspension fixing plate, a spring, a spring bump, a lifting bump and a guide column, wherein a compression stroke of the spring is smaller than a lifting stroke of the lifting platform; when a lifting movement and an independent suspension are in parallel, and a stroke of the lifting movement is larger than a length of the spring, the parallel-series connection legs are rigid active suspension vibration reduction controlled by the lifting motor; when a lifting distance of the lifting platform is smaller than the length of the spring, the lifting bump contacts with the spring bump, the lifting motor holds the brake to be opened, and the parallel-series connection legs provide flexible passive vibration reduction based on independent suspension of the spring; the active and passive vibration reduction forms a rigid-flexible coupling vibration reduction structure; revolving centers of revolving platforms in the independent suspension structure are centrally and symmetrically arranged, so that an additional bending torque on the guide rail are mutually offset, and an additional load on the lifting guide rail is not increased.

A six-degree-of-freedom attitude adjustment platform includes a frame, a controller and a plurality of parallel-series connection legs, wherein a base in each of the parallel-series connection legs is fixedly connected with the frame; rotating axes of the rotating platforms in the respective parallel-series connection legs are parallel to each other; and linear guide rails of the lifting platforms in the respective parallel-series connection legs are parallel to each other; at least two of active-passive differential parallel-series connection legs are drive legs, the steering motor and the linear driver are active drives, and at least one of the first wheel and the second wheel is an active wheel or both of them are active drives. A battery pack is arranged in the frame, for supplying power to distributed controllers in the frame and the parallel-series connection legs.

The first wheels and the second wheels of all of the active-passive differential parallel-series connection legs fixedly connected with the frame are in contact with ground and have no degree of freedom in a direction perpendicular to the ground at the contact point; the frame, all the active-passive differential parallel-series connection legs fixedly connected with the frame form a six-degree-of-freedom attitude adjustment platform with the ground.

Optionally, in the six-degree-of-freedom attitude adjustment platform, the number of the parallel-series connection legs is three, and the parallel-series connection legs are active-passive differential parallel-series connection legs, and the base in each of the active-passive differential parallel-series connection legs are respectively fixedly connected with the frame. The three active-passive differential parallel-series connection legs are arranged in a triangle shape, and a distributed controller and a battery pack are arranged inside the frame.

Optionally, in the six-degree-of-freedom attitude adjustment platform, the number of the parallel-series connection legs is four, which are respectively arranged at four corners of the frame, and two or three or four of the four active-passive differential parallel-series connection legs may be drive legs.

Optionally, the number of the active-passive differential parallel-series connection legs is six, which are respectively arranged at the two ends or two sides of the frame in a 冂-shape, sot that bearing capacity of the platform can be effectively improved by increasing the number of the legs of the six-degree-of-freedom attitude adjustment platform.

Optionally, sensors, such as camera, ultrasonic, laser radar and millimeter wave radar may be installed or mounted around the frame to improve an ability of the six-degree-of-freedom attitude adjustment platform sensing the external environment, and a vertical lifting platform or other mechanisms or robots may be mounted to further expand an application range of the six-degree-of-freedom attitude adjustment platform.

In another embodiment of the present disclosure, a parallel-series connection leg based on gravity sealing or ground sealing, which includes a base, a lifting platform, a steering frame, a wheel seat and wheels, wherein the base is sequentially connected in series with a linear driver, the lifting platform, the steering frame and the wheel seat, and forms a partial parallel connection with the ground under the condition of gravity sealing; the wheel includes a first wheel and a second wheel which are respectively positioned on the first side or the second side of the wheel frame; and the first wheel is rotationally connected with the wheel seat to form a rotating pair $Ry1$; the second wheel is rotationally connected with the wheel seat to form a rotating pair $Ry2$; the lifting platform is slidably connected with the base to form a moving pair $Pz$ as an active pair; the lifting platform is driven by the linear driver; the steering frame is driven by a steering motor arranged on the lifting platform to form rotational connection; the steering frame is rotationally connected with the lifting platform to form a rotating pair $Rz$; the wheel seat is rotationally connected with the steering frame to form a rotating pair $Rx$; the linear guide rail of the lifting platform is parallel to the axis of the rotating pair $Rz$; the axis of the rotating pair $Rz$ is perpendicular to the axis of the rotating pair $Rx$; the axes of the rotating pairs $Ry1$ and $Ry2$ are coaxial, and the axis of the rotating pair $Rx$ perpendicularly intersects with the axes of the rotating pair $Ry1$ and $Ry2$; the axis of the rotating pair $Rz$ passes through the intersection of the axis of the rotating pair $Rx$ and the axes of the rotating pair $Ry1$ and $Ry2$ .

In practice, "based on gravity sealing" refers to that there is no movement freedom degree in vertical direction between the contact points of wheels and the ground. The first and second wheels in the parallel-series connection legs are in contact with the ground and perform pure rolling movement relative to the ground or along a certain point of width. If the ground is regarded as a fixed platform and the wheel seat is regarded as a moving platform, the first wheel, the second wheel, the ground and the wheel seat form a local and parallel structure. Furthermore, the base is connected in series with the wheel seat through the lifting platform and the steering frame, and thereby forming a parallel-series connection leg based on the gravity sealing, and the mechanism configuration thereof is $PzRzRx(Ry1+Ry2)Rp$.

Preferably, when the parallel-series connection leg is a drive leg, at least one of the first wheel and the second wheel is the active wheel or both of the wheels are active to constitute active differential movement.

Preferably, the second wheel is an active wheel, and the second wheel is directly driven by a walking motor or indirectly driven by the walking motor through a transmission mechanism. Preferably, the second wheel is indirectly driven by a walking motor through a pulley set; the walking motor is installed on a wheel seat; the pulley set includes a first pulley, a sychronous belt and a second pulley, wherein the first pulley is fixedly connected with the output shaft of the walking motor, and the second pulley is fixedly connected with one side of the second wheel, and the synchronous belt is fit to the first pulley and the second pulley.

Preferably, both the first wheel and the second wheel are active wheels. The first wheel and the second wheel are respectively driven by two independent walking motors. When a same-direction rotation of the first wheel and the second wheel is driven by the two walking motors, the parallel-series connection leg walks forward. When a different-direction rotation of the first wheel and the second wheel are driven by the two walking motors, an active differential driving working state is formed, so as to rotate the steering frame relative to the lifting platform and change the traveling direction of the parallel-series connection leg.

Preferably, the lifting platform is also provided with an angle sensor for detecting a rotation angle between the steering frame with respect to the lifting platform.

Preferably, the lifting platform is also provided with an angle sensor, and the lifting platform may also be provided with a holding brake or a clutch.

Preferably, the parallel-series connection leg based on the gravity sealing further includes an independent suspension component structure. The independent suspension component is arranged between the lifting platform and the steering frame, and includes a suspension fixed plate, a spring, a spring bump, a lifting bump, a guide column, a lifting platform and the steering frame. In the independent suspension component, a compression stroke of the spring is smaller than a lifting stroke of the lifting platform, a lifting motion and an independent suspension are in parallel, and the stroke of the lifting motion is longer than the length of the spring. When a lifting distance of the lifting platform is larger than the length of the spring, the parallel-series connection legs are rigid active suspension vibration reduction controlled by the lifting motor. When the lifting distance of the lifting platform is smaller than the length of the spring, the lifting bump contacts with the spring bump, the lifting motor holds the brake to be opened, and the parallel-series connection leg provides flexible passive vibration reduction based on independent suspension of the spring. The active-passive vibration reduction constitutes a rigid-flexible coupling vibration reduction structure.

A moving precise attitude adjustment platform includes a frame, a controller and parallel-series connection legs. Preferably, the number of the parallel-series connection legs is three or four or six. The base in each of the parallel-series connection legs is fixedly connected with the frame. The linear guide rails of the moving pair $Pz$ in the respective parallel-series connection legs are parallel to each other. the rotating axes of the rotating frames in the respective parallel-series connection legs are parallel to each other.

Preferably, the moving precise attitude adjustment platform of the present invention includes at least two parallel-connected legs based on the gravity sealing as drive legs, wherein the steering motor and the linear driver are active drives, and at least one of the first wheel and the second wheel is active drive or both of them are active drives.

Compared with the prior art, the present disclosure has following advantages:

From the mechanistic perspective of the present disclosure, the vehicle body in the six-freedom-degree position-adjusting platform is equivalent to a mobile platform, the ground is equivalent to a fixing platform, and the respective series-parallel connect supporting legs are equivalent to a movement branch chains for connecting the fixing platform and the mobile platform, so that brand-new parallel mechanism connecting the fixing platform and the mobile platform, thus forming a new parallel mechanism based on an open fixing platform (ground)-six-degree-of-freedom position-adjusting platform: mechanism configuration 3–RzPzRx (Ry1+Ry2)Rp, 4–zPzRx(Ry1+Ry2)Rp, 6–RzPzRx(Ry1+Ry2)Rp.

The wheels include a first wheel and a second wheel. There are three driving modes according to the actual requirements, a passive walking without motor driving is designed; the first wheel and the second wheel are respectively driven by double motors to realize the active synchronous driving or the active differential driving; the active differential driving of the single motor is implemented by a differential gear train arranged between the first wheel and the second wheel. A central slewing movement of the active-passive differential series-parallel connection supporting leg realized by the active differential motion of the first wheel and the second wheel and a redundancy of the central slewing movement realized by the slewing motor can effectively improve accuracy of the center slewing movement of the active-passive differential series-parallel connection supporting legs, and also implement the walking function of the wheels.

The supporting legs of the vehicle body can be designed by introducing an open ground as the fixing platform and taking into account pure rolling motion between the wheels and the ground (sliding friction is much greater than rolling friction), so that the series-parallel connection supporting leg in the present disclosure can not only have the conventional walking function, but also have the function of adjusting the position of the car body, thereby organically integrating the omnidirectional movement of the car body with the position adjustment, and achieving six-degree-of-freedom position adjustment in space while improving arbitrariness of the six-degree-of-freedom position-adjusting platform within the structural space; at the same time, due to multi-redundant structural characteristics of the formed parallel mechanism, the six-degree-of-freedom position-adjusting platform has extremely high motion accuracy, and thus fundamentally solves the problems that the position cannot be adjusted as moving, the movement cannot be made as adjusting the position, or coexistence of movement and the position adjustment system leads to mechanical and control systems at extremely complicated hazards, such that the movement and position adjustment are not restricted in the structural space, and effectively reduces an overall height of the six-degree-of-freedom position-adjusting platform, so that six-degree-of-freedom position-adjusting docking and assembling can be achieved in some low spaces, accordingly a new technical equipment is provided for the field of smart assembly.

As a special equipment integrating transportation and position adjustment, the mobile precision position-adjusting platform plays an important role in automation or intelligent technology systems. In the process of transporting target parts, it has the capability to actively adapt to more complex ground changes and keep the special position of the transport target part unchanged, and the movement is flexible, stable and reliable, and the path and trajectory planning are not restricted; in the process of position adjustment, integration and continuity of micro movement and the position-adjusting movement and the location state are not restricted, and it has high-precision posture adjustment ability.

BRIEF DESCRIPTION OF THE DRAWINGS

In order to more clearly illustrate the detailed description of the present disclosure or the technical solutions in the prior art, the drawings that are needed in the detailed description of the present disclosure or the prior art will be briefly described below. Throughout the drawings, like elements or portions are generally identified by like reference numerals. In the drawings, elements or portions are not necessarily drawn to scale.

Figure 1:
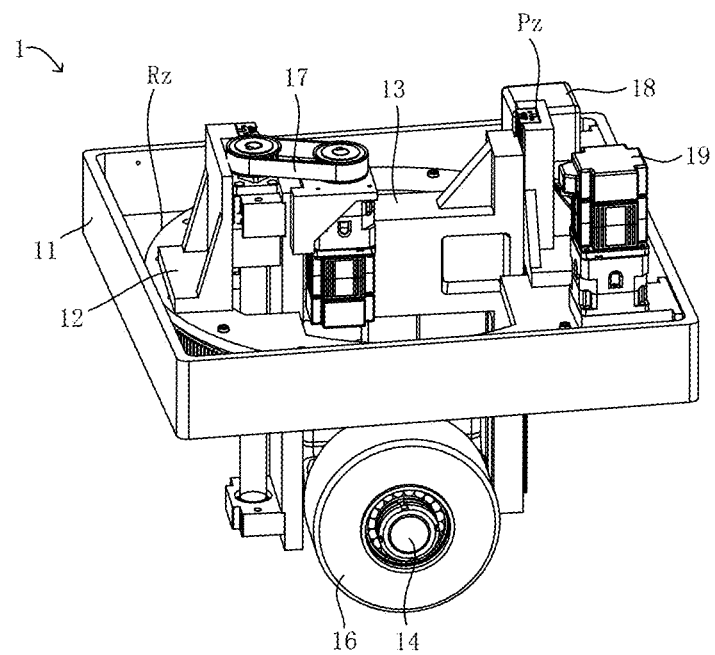
FIG. 1 is a schematic structural view of an active-passive differential series-parallel connection supporting leg according to one embodiment of the present disclosure.

IN THE DRAWINGS 1 series-parallel supporting leg; 2 frame; 3 controller; 4 battery pack; 11 base; 12 steering table; 121 turntable bearing; 122 sliding block; 123 linear guide rail; 13 lifting table; 131 swing bearing; 14 wheel seat; 141 first wheel bearing; 142 second wheel bearing; 15 first wheel; 16 second wheel; 17 linear driver; 171 nut; 172 screw rod; 173 lifting motor; 174 bearing seat; 175 synchronous belt; 18 angle sensor; 181 detection gear; 19 steering motor; 191 driving gear; 20 contracting brake; 21 first torque sensor; 22 walking single motor; 221, 222, 223 walking motor; 231, 232 second torque sensor; 24 pulley set; 241 first pulley; 242 synchronous belt; 243 second pulley; 25 differential gear train; 251 driving bevel gear; 252 planetary carrier; 253 large bevel gear; 254 planetary bevel gear; 255 first bevel gear; 256 second bevel gear; 5 independent suspension assembly; 51 suspension fixing plate; 52 spring; 53 spring collision block; 54 lifting collision block; 55 guide column; 10 series-parallel connection supporting leg; 30 controller; 40 battery pack; 110 base; 1110 sliding block; 1120 linear guide rail; 120 lifting table; 130 steering frame; 1310 steering bearing; 1320 swing bearing; 140 wheel seat; 1410 first bearing; 1420 second bearing; 150 first wheel; 160 second wheel; 170 linear driver; 1710 nut; 1720 screw rod; 1730 lifting motor; 1740 bearing seat; 1750 synchronous belt; 180 angle sensor; 190 contracting brake; 20 frame; 210 steering motor; 200 first torque sensor; 2210, 2220 walking motor; 2310, 2320 second torque sensor; 240 pulley set; 2410 first pulley; 2420 synchronous belt; 2430 second pulley; 250 differential wheel train; 2510 driving bevel gear; 2520 planetary carrier; 2530 large bevel gear; 2550 first bevel gear; 2560 second bevel gear; 50 independent suspension assembly; 510 suspension fixing plate; 520 spring; 530 spring collision block; 540 lifting collision block; 550 guide column

DETAILED DESCRIPTION

Embodiments of the present disclosure will be described in detail below with reference to the accompanying drawings. The following examples are only for illustrating the technical solutions of the present disclosure more clearly, and therefore are only examples, and the protection scope of the present disclosure is not limited thereby.

It is to be noted that technical or scientific terms used herein should have the ordinary meaning as understood by those skilled in the art, unless otherwise specified.

According to the first aspect of the present disclosure, an active-passive differential series-parallel connection supporting leg is provided. The series-parallel connection supporting leg is the active-passive differential series-parallel connecting supporting leg, specifically, including a base 11, a steering table 12, a lifting table 13, a wheel seat 14, a first wheel 15, a second wheel 16 and a motor rotation speed transmission system. The steering table 12 is rotationally connected with the base 11 to form a rotating pair Rz. The lifting table 13 is slidably connected with the steering table 12 to form a moving pair Pz, and the moving pair Pz is an active pair and is driven by a linear driver 17. The wheel seat 14 is rotationally connected with the lifting table 13 to form a rotating pair Rx, which belongs to a passive pair. The wheel includes a first wheel 15 and a second wheel 16, which are respectively located on both sides of the rotating pair Rx.

Preferably, the first wheel 15 is rotatably connected with the wheel seat 14 to form a rotating pair Ry1; and the second wheel 16 is rotatably connected with the wheel seat 14 to form a rotating pair Ry2. The first wheel 15 and the second wheel 16 form a synchronous drive or an active differential mechanism drive, or a single motor drive differential bevel gear mechanism realizes a synchronous drive or a passive differential drive. According to an embodiment of the present disclosure, the first wheel 15 and the second wheel 16 are independently driven by two motor reduction transmission systems, respectively.

An axis of the rotating pair Rz is parallel to a linear guide rail 123 of the rotating pair Pz, and the linear guide rail 123 of the rotating pair Pz is perpendicular to an axis of the rotating pair Rx, and the axis of the rotating pair Rx is perpendicular to the axes of the rotating pair Ry1 and the rotating pair Ry2; the axes of the rotating pair Ry1 and the rotating pair Ry2 are coaxial. Preferably, the wheel seat 14 has a cross structure; specifically, the wheel seat 14 is a cross-shaped conjoined shaft, and two axes of the cross-shaped conjoined shaft are respectively an axis of the rotating pair Rx and the axis of the rotating pair Ry1 and the rotating pair Ry2, wherein the two axes intersect and are perpendicular to each other.

In practical use, a closed structure is formed together with the ground under the action of gravity, there is no vertical movement freedom degree exists at the contact point between the wheels and the ground, the first wheel 15 and the second wheel 16 in the parallel-serial connection supporting leg are in contact with the ground and can do pure rolling motion or a wheel width center pure rolling motion, if the ground is regarded as a fixing platform, and the wheel seat 14 is regarded as a moving platform, the first wheel 15, the second wheel 16, the ground and the wheel seat 14 form a local parallel structure. When the ground is uneven, the first wheel 15 and the second wheel 16 simultaneously rotate around the axis of the rotating pair Rx, the height of the wheels can be changed along with the change of the ground, and the pressure of the wheels keeps constant at any time. Further, the base 11 is in series connected with the wheel seat 14 through the steering table 12 and the lifting table 13, so as to form an active-passive differential series-parallel connection supporting leg.

Preferably, the active-passive differential series-parallel connection supporting legs further includes a steering motor 19, and a direction and a positioning of the steering table 12 are driven by the steering motor 19 arranged on the base 11. By providing the steering motor 19, axial directions of the first wheel 15 and the second wheel 16 in the series-parallel connection supporting leg can be actively changed, and a directional state stability can be maintained.

In order to avoid the steering table 12 from being interfered by an external force, it rotates under the condition that the ground is inconsistent in the shape and the height or the series-parallel connection supporting leg 1 is lifted to be away from the ground, so that the position state and the motion precision of the series-parallel connection supporting leg 1 are affected. Preferably, the base 11 is further provided with a contracting brake 20 or a clutch, instead of the steering motor 19, to passively steer and control locking action, and the steering table 12 can be locked to prevent the steering table from rotating relative to the base 11, so that the steering table 12 can be locked to be prevented rotating relative to the base 11, but keep the original state unchanged, or release the passive steering.

Preferably, the base 11 is further provided with an angle sensor 18 for detecting or recording a rotation angle of the steering table 12 relative to the base 11, and for controlling or keeping a state of the multiple legs or directions of the axes of the rotating pairs Rx parallel to each other or forming a certain relative relationship to meet linear motion or steering and turning requirements.

When the active-passive differential series-parallel connection supporting leg 1 is a driving leg, at least one of the first wheel 15 and the second wheel 16 is a driving wheel, that is, one is active and the other is passive or both wheels are active.

Preferably, the driving wheel of the first wheel 15 and the second wheel 16 is directly driven by a walking motor 221 or a walking motor 222, or indirectly driven by the walking motor reducer in a transmission manner such as a chain, a pulley, a gear and the like.

Preferably, the rotational movements of the first wheel 15 and the second wheel 16 are driven actively and differentially by a dual motor reducer transmission system, respectively, or indirectly by a single motor through a differential gear train.

Preferably, the differential gear train includes a first bevel gear 255 fixedly connected with the first wheel 15, a second bevel gear 256 fixedly connected with the second wheel 16, and a planetary bevel gear 254 engaged with the first bevel gear 255 and the second bevel gear 256. The planetary bevel gear 254 is hinged to the planetary carrier 252 that is fixedly connected to an end face of the large bevel gear 253. The large bevel gear 253 is rotatably connected with the wheel seat 14, and is driven by a driving bevel gear 251 engaged with the large bevel gear 253, and the driving bevel gear 251 is fixedly connected to an output shaft of the walking single motor 22 fixedly connected to the outer shell of the planetary gear train. On the outer shell of the differential gear train, the symmetrical position of the first wheel 15 and the second wheel 16 is the position that coincides with an output axis of the walking single motor 22, and two sections of the rotating shaft are arranged symmetrically with respect to the axes of the first wheel 15 and the second wheel 16 perpendicularly intersecting with each other, and are rotatably connected with the lifting table 13 to form a rotating pair Rx. The motion states of the first wheel 15 and the second wheel 16 are driven and controlled by the steering motor 19 and the walking single motor 22.

Preferably, the linear driver 17 may be formed of a ball screw rod and a motor reducer, in which a nut 171 of the ball screw rod is fixedly connected with the steering table 12, and a screw rod 172 of the ball screw rod is rotatably connected with the lifting table 13 through a supporting seat, and the screw rod 172 is driven by a motor reducer system on the lifting table.

According to the second aspect of the present disclosure, a set of large-load six-degree-of-freedom position-adjusting robot platforms is provided, which is constructed in a form that a plurality of legs are distributed and connected in parallel. The set of six-degree-of-freedom position-adjusting robot platforms includes a frame 2, a controller 3 and three, four and six active-passive differential series-parallel connection supporting legs 1 as above mentioned. The base 11 of the series-parallel connection supporting leg 1 is fixedly connected with the frame 2. The axes of the rotating pairs Rz in the series-parallel connection supporting legs 1 are parallel to each other. The linear guides 123 of the moving pair Pz in the series-parallel connection supporting legs 1 are parallel to each other. Three legs in the six-degree-of-freedom position-adjusting robot platform with three legs are arranged in an equilateral triangle or isosceles triangle shape. Four legs in the six-degree-of-freedom position-adjusting robot platform with four legs are arranged in a square or a rectangular shape. Six legs in the six-degree-of-freedom position-adjusting robot platform with six legs are arranged in a " ☐ " shape. The six-degree-of-freedom position-adjusting robot platform includes a frame, a distributed controller and a plurality of multi-branch parallel-connected legs (i.e., three supporting legs, four supporting legs or six supporting legs), wherein a plurality of supporting legs are fixedly connected with the frame through a base; the rotating pairs Rz of the supporting legs are parallel to each other; and guide rails of the moving pairs Pz of the supporting legs are parallel to each other; the supporting legs of the six-degree-of-freedom position-adjusting platform with three supporting legs are arranged in a triangular shape; the supporting legs of the six-degree-of-freedom position-adjusting robot platform with four supporting legs are arranged in a square or rectangular or rhombic shape; the supporting legs of the six-degree-of-freedom position-adjusting robot platform with six supporting legs are arranged in a " ☐ " shape.

Preferably, at least two active-passive differential series-parallel connection supporting legs 1 in the six-degree-of-freedom position-adjusting robot platform are driving legs, that is, at least one of the steering motor 19, the linear driver 17, the first wheel 15 and the second wheel 16 is a driving wheel or all of which are the driving wheels.

Preferably, a battery pack 4 is further arranged inside the frame 2 and used for supplying power to the distributed controller 3 and each of the series-parallel connection supporting legs 1 in the frame 1.

Preferably, the active-passive differential series-parallel connection supporting leg 1 is provided with an independent suspension assembly 5. The independent suspension assembly 5 is composed of a suspension fixing plate 51, a spring 52, a spring collision block 53, a lifting collision block 54 and a guide column 55. A compression stroke of the spring 52 is smaller than a lifting stroke of the lifting table 13, the lifting motion and the independent suspension are in parallel relation, and the lifting motion stroke is larger than a length of the spring 52. When the lifting distance of the lifting table 13 is greater than the length of the spring 52, the series-parallel connection supporting leg 1 is a rigid active suspension vibration reduction controlled by a lifting motor 173. When the lifting distance of the lifting table 13 is less than the length of the spring 52, the lifting collision block 54 is in contact with the spring collision block 53, the contracting brake of the lifting motor 173 is opened, the series-parallel connection supporting leg 1 is flexible passive vibration reduction based on the independent suspension of the spring 52. The active and passive vibration reduction forms a rigid-flexible coupling vibration reduction structure. The independent suspension assembly 5 and a rotary center of a rotary table are arranged in a central symmetry manner, so that additional bending moment on the linear guide rail 123 is mutually offset, and additional load on the linear guide rail 123 is not increased.

The active-passive differential series-parallel connection supporting legs and the six-degree-of-freedom position-adjusting robot platform in the present disclosure are explained in detail below with reference to the drawings. The features of the following embodiments and implementations may be combined with each other without conflict.

As shown in FIGS. 1 to 17, it is illustrated in the same rectangular coordinate system, a Z axis is perpendicular to a horizontal plane, an X axis and a Y axis are located within the horizontal plane, an axial direction of the first wheel and the second wheel is the Y axis, and a rolling direction is the X axis.

Figure 2:
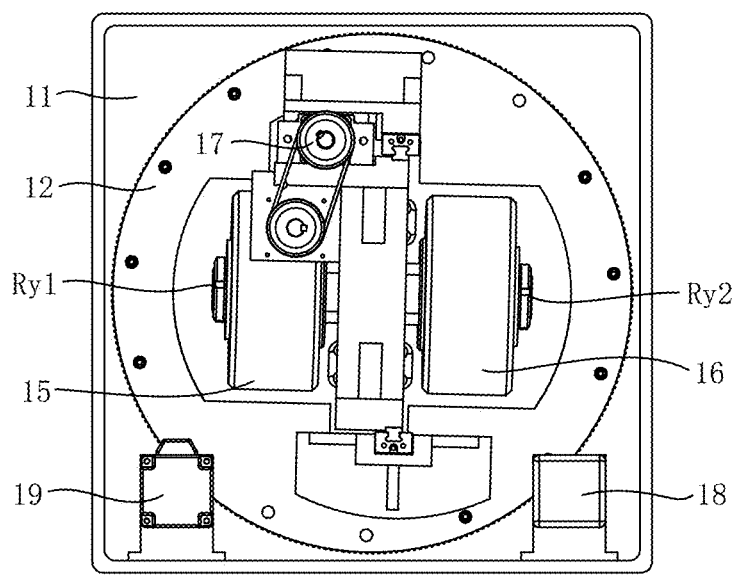
FIG. 2 is a top view of an active-passive differential series-parallel connection supporting leg according to one embodiment of the present disclosure.
Figure 3:
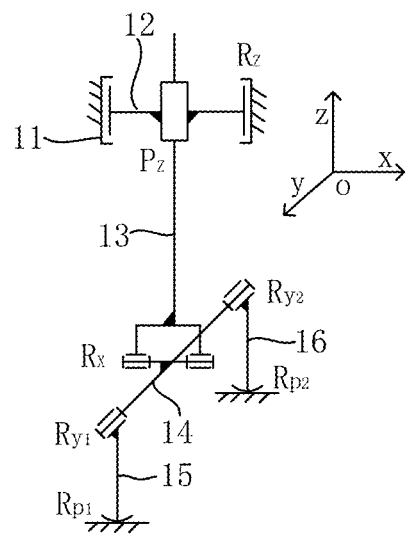
FIG. 3 is a structural principle view of an active-passive differential series-parallel connection supporting leg according to one embodiment of the present disclosure.

FIGS. 1 and 2 show schematic structural views of an active-passive differential series-parallel connection supporting leg 1 according to an exemplary embodiment of the present disclosure. A structural principle view of the series-parallel connection supporting leg 1 is shown in FIG. 3. Referring to FIGS. 1 and 2, the series-parallel connection supporting leg 1 includes a base 11, a steering table 12, a lifting table 13, a wheel mount 14, a first wheel 15, a second wheel 16, and a linear driver 17. The steering table 12 is rotatably connected to the base 11. The lifting table 13 is connected with the steering table 12 and can slide along the steering table 12, and the lifting table 13 is connected with the linear driver 17 and is driven by the linear driver 17. The wheel seat 14 is rotatably connected with the lifting table 13. The respective wheels are respectively positioned at two sides of the wheel seat 14. The first wheel 15 is rotatably connected with the wheel seat, and the second wheel 16 is rotatably connected with the wheel seat. The rotating table is provided with a guide rail, such as a linear guide rail 123, along which the lifting table is driven by the linear driver to slide on the steering table.

Preferably, the base 11 is a hollow uncovered box, a circular opening is provided on the lower surface of the base, and a first opening is provided in the rotating table, and each of the openings is configured to connect the lifting table 13 and the linear driver with the rotating table. The steering table 12 is rotatably mounted to the base 11 through a turntable bearing 121. A gear teeth is provided on an outer ring of the turntable bearing. An angle sensor 18 and a steering motor 19 are arranged in the base. An output shaft of the steering motor 19 is connected with a driving gear 191, the angle sensor 18, for example an input end, is connected with a detection gear 181. The detection gear and the driving gear are matched with the gear teeth of the outer ring of the turntable bearing. The steering motor 19 drives the turntable bearing 121 to rotate through the detection gear 191, and rotates following the detection gear 181 and outputs the rotated angle of the turntable bearing through the angle sensor.

Specifically, the steering table 12 is rotatably connected with the base 11 to form a rotating pair Rz; the lifting table 13 is slidably connected with the steering table 12 to form a moving pair Pz; in which the moving pair Pz is an active moving pair, and the lifting table 13 is driven by the linear driver 17. The wheel seat 14 is rotatably connected with the lifting table 13 to form a rotating pair Rx. The first wheel 15 and the second wheel 16 are positioned at two sides of the rotating pair Rx, the first wheel 15 is rotatably connected with the wheel seat 14 to form a rotating pair Ry1, and the second wheel 16 is rotatably connected with the wheel seat 14 to form a rotating pair Ry2. The first wheel 15 is in contact with the ground to form a rolling pair Rp1 and the second wheel 16 is in contact with the ground to form a rolling pair Rp2.

As shown in FIG. 3, the moving pair formed between the respective parts in the series-parallel connection supporting leg 1 satisfies a specific geometric relationship, specifically the axis of the rotating pair Rz is not perpendicular to the axis of the moving pair Pz, and the minimum included angle between the Rz axis and the Pz axis is ≤50 degrees; the axis of the moving pair Pz is not parallel to the axis of the rotating pair Rx, and the minimum included angle between the Pz axis and the Rx axis is 50 degrees; the axis of the rotating pair Rx is not parallel to the axis of the rotating pair Ry1 or the rotating pair Ry2, and the minimum included angle between the Rx axis and the Ry1 or Ry2 axis is ≥50 degrees; the axis of the rotating pair Ry1 is parallel to the axis of the rotating pair Ry2.

Preferably, as shown in FIGS. 1 and 2, the axis of the rotating pair Rz is parallel to the guide rail of the rotating pair Pz is perpendicular to the axis of the rotating pair Rx, and the axis of the rotating pair Rx is perpendicular to the axis of the rotating pair Ry1 or the rotating pair Ry2. The axis of the rotating pair Ry1 is coaxial to the axis of the rotating pair Ry2.

Figure 4:
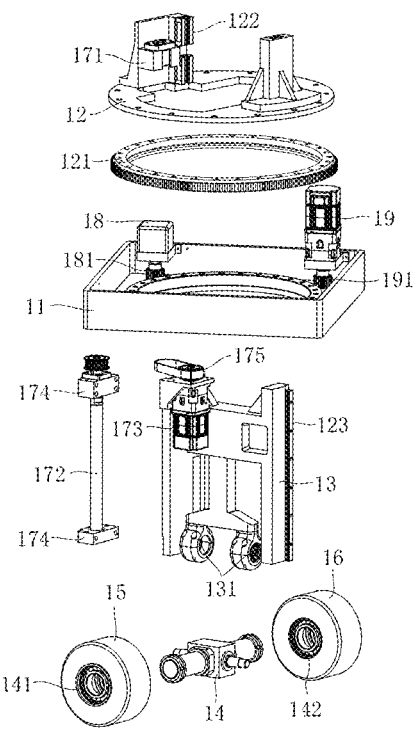
FIG. 4 is an exploded view of an active-passive differential series-parallel connection supporting leg according to one embodiment of the present disclosure.
Figure 5:
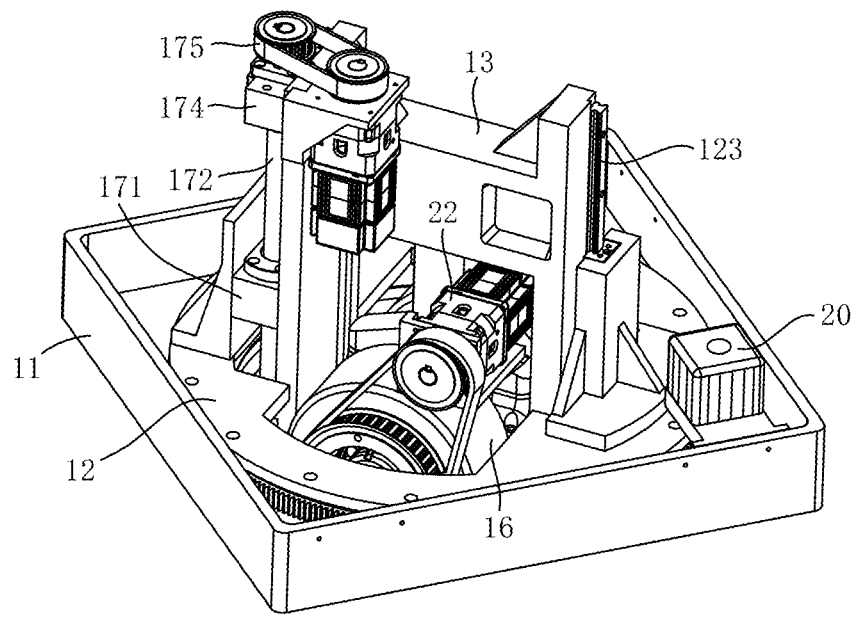
FIG. 5 is a schematic structural view of an active-passive differential series-parallel connection supporting leg according to another embodiment of the present disclosure.

As shown in FIGS. 4 and 5, in an embodiment, the linear driver 17 is a ball screw rod, the linear driver 17 includes a nut 171, a screw rod 172, a lifting motor 173, a bearing seat 174, and a synchronous belt 175. The nut 171 is fixedly connected to the steering table 12, and the nut 171 is disposed on the upper surface of the steering table 12, preferably, the nut 171 is supported and fixed by a first support plate. At the two ends of the screw rod 172 are provided bearing seats 174, and the bearing seats 174 are fixedly connected with the lifting table, specifically, the bearing seats 174 are fixedly connected to one side of the lifting table 13. The lifting motor 173 drives the screw rod 172 to rotate through the synchronous belt 175. Preferably, the linear driver 17 may also be a driving structure, such as a hydraulic cylinder, a linear module and/or the like, capable of implementing the functions of the present disclosure. It is appropriately selected according to the actual situation that the hydraulic cylinder, the linear module and/or the like is fixedly connected to the lifting table and connects the lifting table and the steering table.

As shown in FIG. 4, an exploded view of an active-passive differential series-parallel connection supporting leg according to one embodiment of the present disclosure is illustrated. In order to reduce friction force at the connection of the respective parts of the series-parallel connection supporting leg 1, the steering table 12 is connected to the base 11 through the turntable bearing 121.

The lifting table 13 is slidably connected with the steering table 12 through a sliding block 122 and a linear guide rail 123. The sliding block 122 is fixedly connected with the steering table 12, specifically, the sliding block 122 is arranged on the upper surface of the steering table 12 and is fixed through a first support plate, and a sliding direction of the sliding block is perpendicular to the steering table 12.

The linear guide rail 123 is fixedly connected to the lifting table 13, the lifting motor 173 is fixedly connected to the lifting table 13, and the output shaft of the lifting motor 173 is connected to an active pulley, to drive the movement of a passive pulley through the synchronous belt 175. The passive pulley is connected to the linear driver 17, furthermore, the passive pulley is connected to the outer side of the bearing seat at the upper end of the screw rod 172 to drive the linear driver. Specifically, the lifting table 13 has an H-shaped structure. A beam of the lifting table 13 is connected to a connecting rod and is connected to the wheel seat 14 through the connecting rod. A swing bearing 131 is provided at a rotary connection of the wheel seat 14 and the lifting table 13. A first wheel bearing 141 is provided at the rotary connection of the first wheel 15 and the wheel seat 14, and a second wheel bearing 142 is provided at the rotary connection of the second wheel 16 and the wheel seat 14.

Preferably, the linear guide rail 123 is disposed at a side portion of the lifting table 13 away from a vertical beam of the lifting motor 173.

The sliding block 122 and the guide rail, such as the linear guide rail 123, are provided at the sliding pair Pz and the bearings are provided at the rotating pair Rz, the rotating pair Rx, the rotating pair Ry1 and the rotating pair Ry2, to effectively reduce friction resistance generated by the series-parallel connection supporting leg 1 during the movement process.

Preferably, the base 11 is provided with a contracting brake 20, as shown in FIG. 5, the steering table 12 is controlled by the contracting brake 20 to rotate or lock relative to the base 11, so as to avoid the steering table 12 from rotating under the condition of external disturbance force or the lifting of the series-parallel connection supporting leg 1, and affect the motion accuracy of the series-parallel connection supporting leg 1, wherein the contracting brake 20 may also be replaced by a clutch or the like.

In order to improve the control precision of the series-parallel connection supporting leg 1, an angle sensor 18 can be optionally mounted at the rotary connection of the steering table 12 and the base 11, a detection gear 181 is mounted at the output end of the angle sensor 18, and the detection gear 181 is engaged with gear teeth on the periphery of the turntable bearing 121 to monitor a rotation angle of the steering table 12 in real time.

Figure 6:
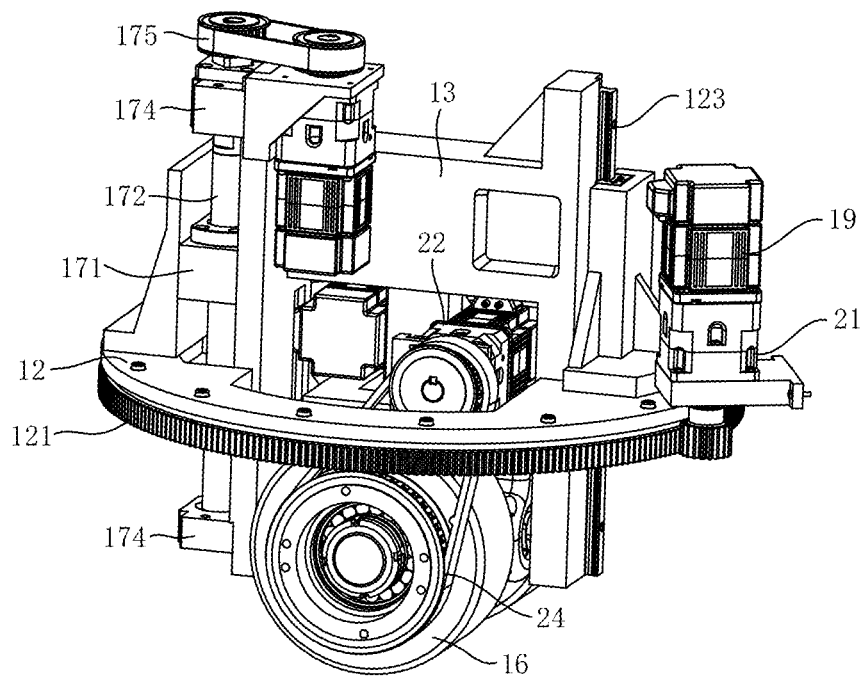
FIG. 6 is a schematic structural view of an active-passive differential series-parallel connection supporting leg according to another embodiment of the present disclosure.

In an alternative embodiment, as shown in FIG. 6, the base 11 is further provided with a steering motor 19 that drives the rotation of the steering table 12. Specifically, a driving gear 191 is installed at the output end of the steering motor 19 that is engaged with the gear teeth on the periphery of the turntable bearing 121, and the rotating direction and the rotating position of the steering table 12 can be actively changed by controlling the steering motor 19, so as to control traveling direction of the first wheel 15 and the second wheel 16. A first torque sensor 21 is further mounted at the output end of the steering motor 19, for monitoring a steering torque between the steering table 12 and the base 11 in real time.

When the series-parallel connection supporting leg 1 is a driving leg, at least one of the first wheel 15 and the second wheel 16 is a driving wheel or both of the first wheel 15 and the second wheel 16 are the driving wheels to form active differential motion. In an alternative embodiment, the second wheel 16 is the driving wheel, and may be directly driven by the walking motor 222, or indirectly driven by the walking motor 222 in a transmission manner such as a chain, a pulley, a gear and the like. In the embodiment shown in FIG. 6, the second wheel 16 is indirectly driven by the walking motor 222 through a pulley set 24; the walking motor 222 is mounted on the wheel seat 14; the pulley set 24 includes a first pulley 241, a synchronous belt 242, and a second pulley 243; the first pulley 241 is fixedly connected with the output shaft of the walking motor 222, the second pulley 243 is fixedly connected to one side of the second wheel 16, and the synchronous belt 242 is cooperatively mounted on the first pulley 241 and the second pulley 243.

Figure 7:
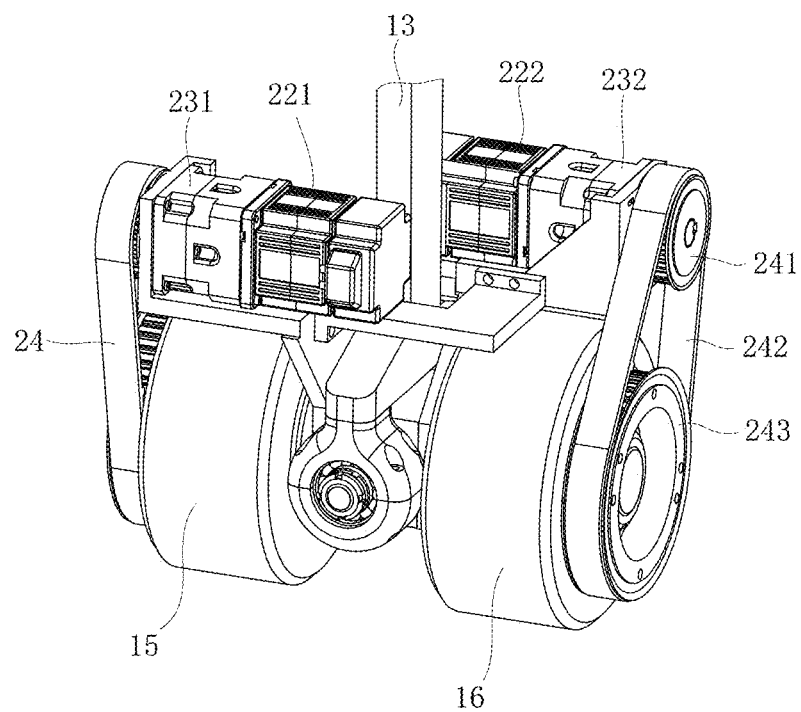
FIG. 7 is a schematic view of a wheel driving structure of the active-passive differential series-parallel connection supporting leg according to another embodiment of the present disclosure.

As shown in FIG. 7, in an alternative embodiment, the first wheel 15 and the second wheel 16 are driving wheels, and are respectively driven by two independent walking motors 221, 222. When the first wheel 15 and the second wheel 16 are driven by the two independent walking motors 221, 222 to rotate in the same direction, the series-parallel connection supporting leg 1 can travel forward or backward, and when the first wheel 15 and the second wheel 16 are driven by the two independent walking motors 221, 222 to rotate in a differential or opposite direction, the lifting table 13 can rotate relative to the steering table 12 to change a traveling direction of the series-parallel connection supporting leg 1. In order to further improve the control accuracy of the first wheel 15 and the second wheel 16, second torque sensors 231, 232 are mounted at the output ends of the walking motors 221, 222, for monitoring an on-wheel torque of the first wheel 15 or the second wheel 16 in real time.

Figure 8:
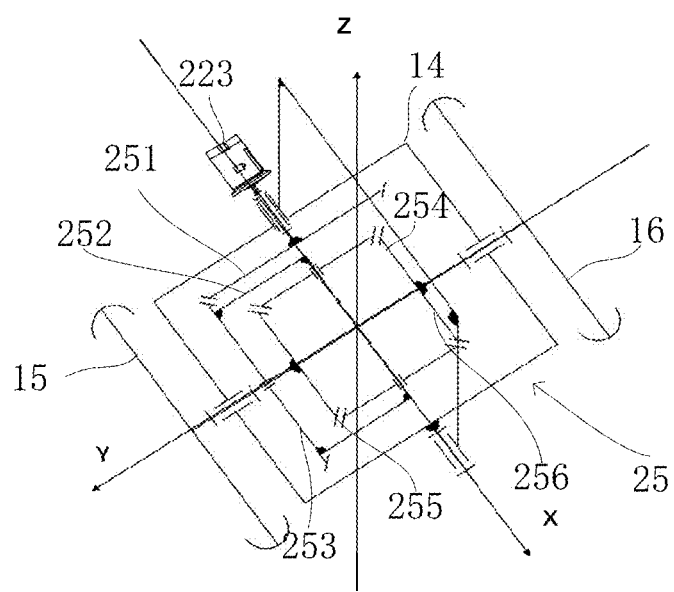
FIG. 8 is a wheel passive differential driving principle view of the active-passive differential series-parallel connection supporting leg according to another embodiment of the present disclosure.

In an alternative embodiment, as shown in FIG. 8, the first wheel 15 and the second wheel 16 are indirectly driven by a walking motor 223 through a differential gear train 25. The first wheel 15 and the second wheel 16 are simultaneously driven by the walking motor 223, so as to solve the problem of the passive difference caused by the different rotation speeds of the first wheel 15 and the second wheel 16 in the steering process.

The differential gear train 25 includes a first bevel gear 255 fixedly connected to the first wheel 15, a second bevel gear 256 fixedly connected to the second wheel 16, and a planetary bevel gear 254 simultaneously engaged with the first bevel gear 255 and the second bevel gear 256. The planetary bevel gear 254 is rotatably connected to the planetary carrier 252 that is fixedly connected to the large bevel gear 253. The large bevel gear 253 is rotatably connected to a shaft of the first wheel 15, and is driven by the driving bevel gear 251 engaged with the large bevel gear. The driving bevel gear 251 is fixedly connected to the output shaft of the walking motor 223. An axis of the first bevel gear 255 fixedly connected with the first wheel 15 is coaxial with an axis of the second bevel gear 256 fixedly connected with the second wheel 16, and is supported on the wheel seat 14 through the rotating pair. The axes of the walking motor 223 and the driving bevel gear 251 are coaxial with the axis of the planetary bevel gear 254, and two sections of the rotating shaft are respectively arranged on the wheel seat 14 and are rotatably connected with the lifting table 13, that is, form a rotating pair Rxis and are coaxial with the axis of the planetary bevel gear 254.

Figure 9:
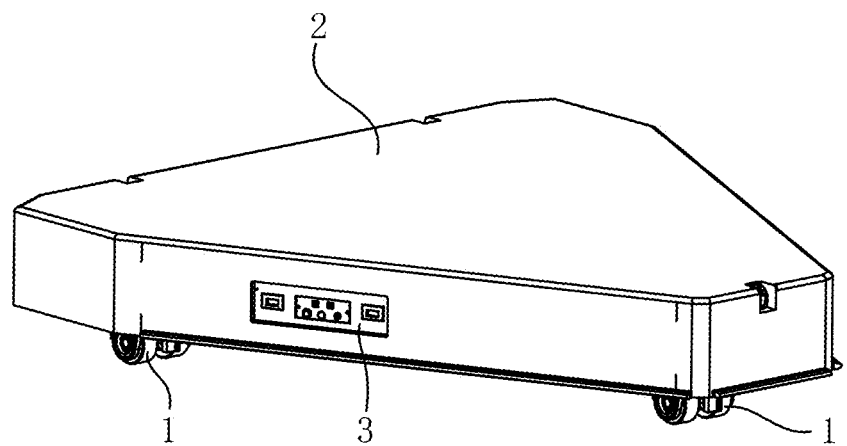
FIG. 9 is a schematic structural view of a three-leg parallel six-degree-of-freedom position-adjusting robot platform according to an embodiment of the present disclosure.
Figure 10:
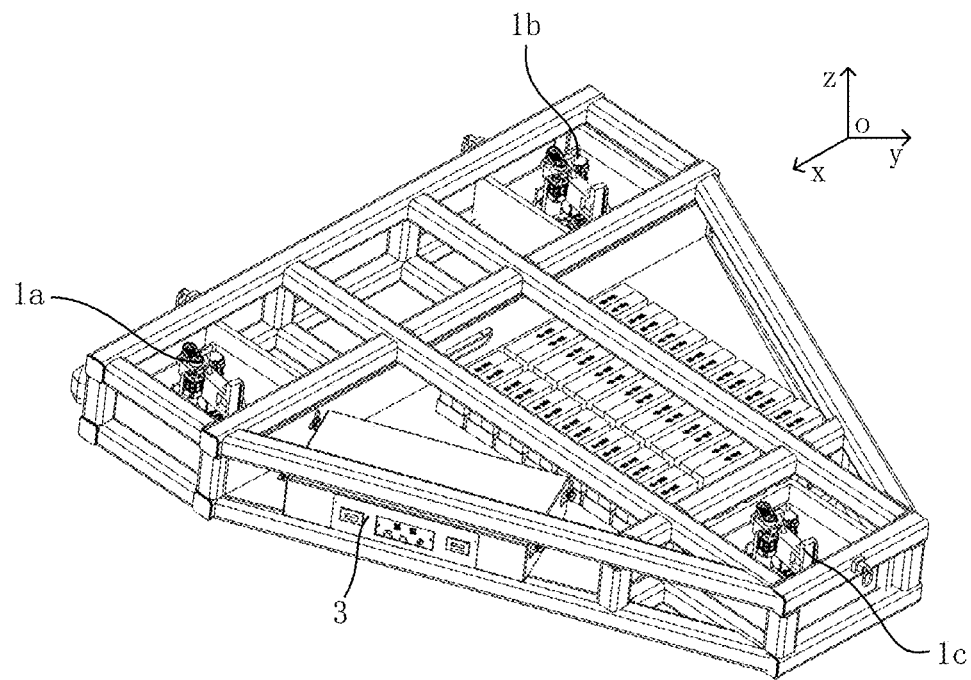
FIG. 10 is a schematic view of an internal structure of the three-leg parallel six-degree-of-freedom position-adjusting robot platform shown in FIG. 9.

Referring to FIGS. 9 and 10, an embodiment of the six-degree-of-freedom position-adjusting robot platform provided by the present disclosure is illustrated. The six-degree-of-freedom position-adjusting robot platform includes a frame 2 and series-parallel connection supporting leg 1. When the number of the series-parallel connection supporting leg is three and all are active-passive differential series-parallel connection supporting legs, the base 11 in each of the active-passive differential series-parallel connection supporting legs 1 is fixedly connected with the frame 2. The three active-passive differential series-parallel connection supporting legs 1 are arranged in a triangular shape. A distributed controller 3 and a battery pack 4 are arranged inside the frame 2.

Preferably, two or three of the three active-passive differential series-parallel connection supporting legs 1 may be the driving legs. At least one of the first wheel 15 and the second wheel 16 in each driving leg is a driving wheel that is driven by the driving motor 221 or 222 to rotate. The frame 2 has a frame structure welded by profiles, to effectively improve a bearing capacity of the frame 2, and decorative plates are mounted on the peripheral surface of the frame 2. The three active-passive differential series-parallel connection supporting legs 1 (i.e., 1a, 1b and 1c) meet the position condition which refers to in the active-passive differential series-parallel connection supporting legs, the axes of the rotating pairs Rz are parallel to each other and the guide rails of the moving pairs Pz are parallel to each other.

Further, in order to improve application scope of the six-degree-of-freedom position-adjusting robot platform, a battery pack 4 is further arranged inside the frame 2 to supply power for the controller 3 and the respective series-parallel connection supporting legs 1, so that the six-degree-of-freedom position-adjusting robot platform can work normally under the condition of external power supply, or in a specific environment under the condition of vehicle-mounted battery power supply.

The six-degree-of-freedom position-adjusting robot platform has a carrying function of the common carrying vehicle, and can move in any direction of the ground and rotate around a Z-axis and any axis parallel to the Z-axis. Meanwhile, the six-degree-of-freedom position-adjusting robot platform also has a function of adjusting space position of the frame 2, and controls the linear drivers 17 in the three series-parallel connection supporting legs 1 to synchronously move up and down, thereby realizing the vertical lifting motion of the frame 2. When the linear drivers 17 in the three series-parallel connection supporting legs 1 are controlled to move asynchronously, the frame 2 can incline in any direction relative to the ground.

Specifically, as shown in FIG. 9, in order to distinguish the series-parallel connection supporting legs, the series-parallel connection supporting legs at different positions are respectively named as 1a, 1b, and 1c. When the series-parallel connection supporting legs 1a and 1b are controlled to be raised and the series-parallel connection supporting leg 1c is lowered, the frame 2 can rotate around the X axis; and of course, when the series-parallel connection supporting legs 1a and 1b can be lowered and the series-parallel connection supporting leg 1c is raised, the frame 2 can reversely rotate around the X axis. When the series-parallel connection supporting leg 1a is controlled to be raised or lowered, and the series-parallel connection supporting leg 1b is accordingly lowered or raised, the frame 2 can rotate around the Y axis.

The above is merely a brief description of the position adjustment and control of the frame 2. In the actual control, when the position of the frame 2 is changed, the first wheel 15 and the second wheel 16 in the series-parallel connection supporting leg are moved accordingly. When the ground is used as a fixing platform, the rolling pairs Rp1 and Rp2 formed by contacting the first wheel 15 and the second wheel 16 with the ground participate in constructing the freedom degrees of the frame 2, so that the first wheel 15 and the second wheel 16 are controlled to perform corresponding micro motion compensation when the position of the frame 2 is adjusted.

Figure 11:
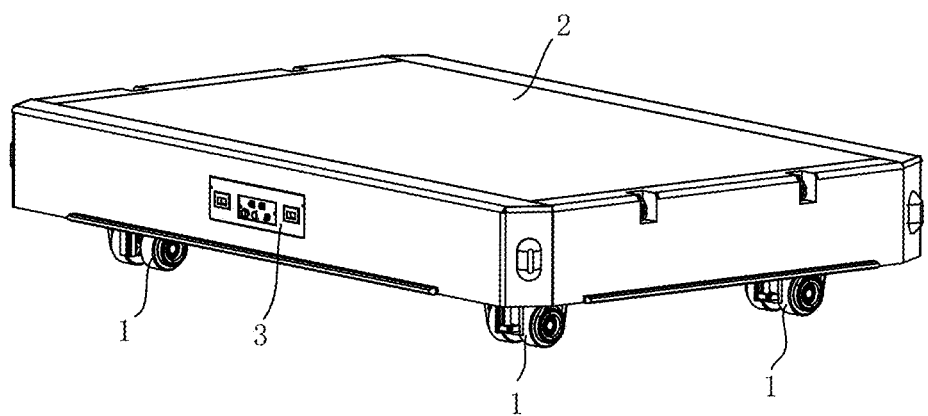
FIG. 11 is a schematic view of a four-leg parallel six-degree-of-freedom position-adjusting robot platform according to another embodiment of the present disclosure.
Figure 12:
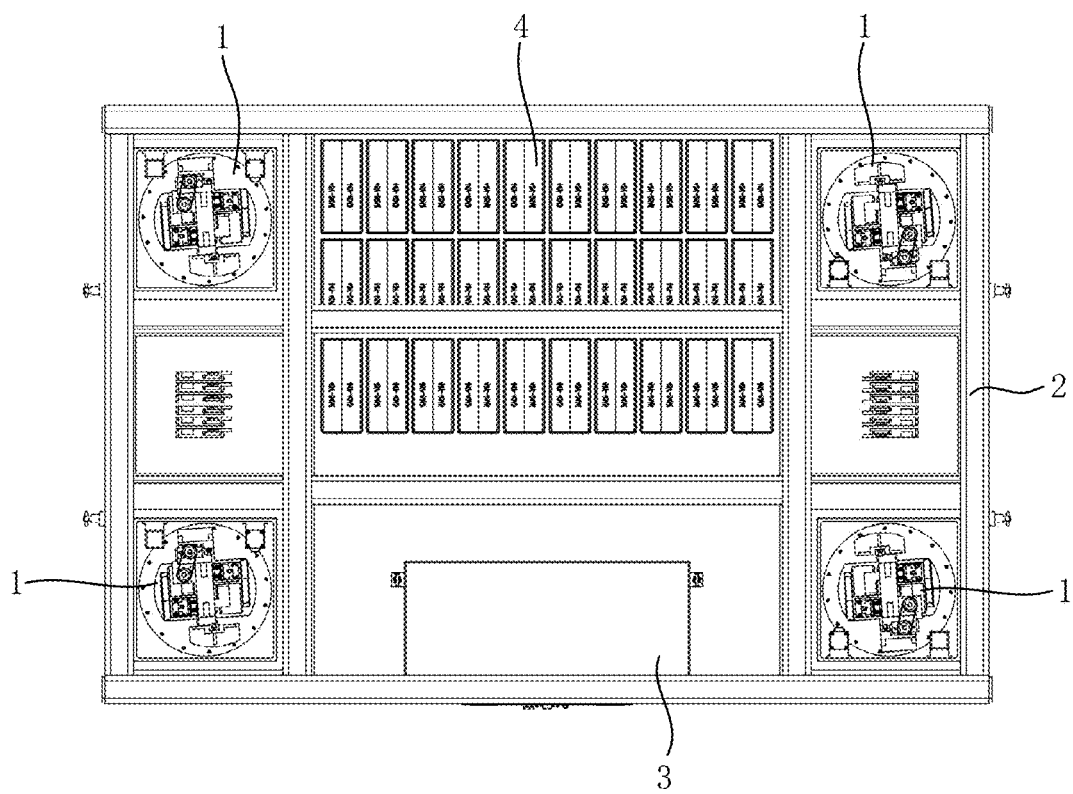
FIG. 12 is a schematic view of an internal structure of the four-leg parallel six-degree-of-freedom position-adjusting robot platform shown in FIG. 11.

As shown in FIGS. 11 and 12, another embodiment of the six-degree-of-freedom position-adjusting robot platform provided by the present disclosure is illustrated. In this embodiment, four active-passive differential series-parallel connection supporting legs 1 are connected to the frame 2 and respectively disposed at four angles of the frame 2. The four active-passive differential series-parallel connection supporting legs 1 are provided such that the bearing area and the bearing capacity of the six-degree-of-freedom position-adjusting robot platform can be effectively improved. Two, three, or four of the four active-passive differential series-parallel connection supporting legs 1 can be the driving legs.

In this embodiment, one of the four active-passive differential series-parallel connection supporting legs 1 is a redundant supporting leg. The redundant supporting leg is provided, on the one hand, the bearing capacity of the six-degree-of-freedom position-adjusting robot platform can be improved, and on the other hand, stability of the six-degree-of-freedom position-adjusting robot platform can be improved. When one of the four active-passive differential series-parallel connection supporting legs has a fault, the redundant supporting leg can replace the fault supporting leg to continue working or be maintained for a short time so that the normal working of the six-freedom-degree position adjusting platform cannot be influenced. It is important for the safety of installing and docking the important products such as satellites, rockets and the like. And a displacement and force detection sensor is arranged in each of the active-passive differential series-parallel connection supporting legs 1. Displacement monitoring is used to control the position and posture accuracy during the position adjustment, and force monitoring is used to avoid appearance of virtual legs or overloaded legs.

A camera, an ultrasonic wave, a laser radar and a millimeter wave radar can be further installed or carried on the periphery of the frame 2 to improve sensing capability of the six-freedom-degree position-adjusting robot platform to the external environment. A vertical lifting table or other mechanisms or a robot can be further carried on the frame 2 to further expand the application range of the six-freedom-degree position-adjusting robot platform.

Figure 13:
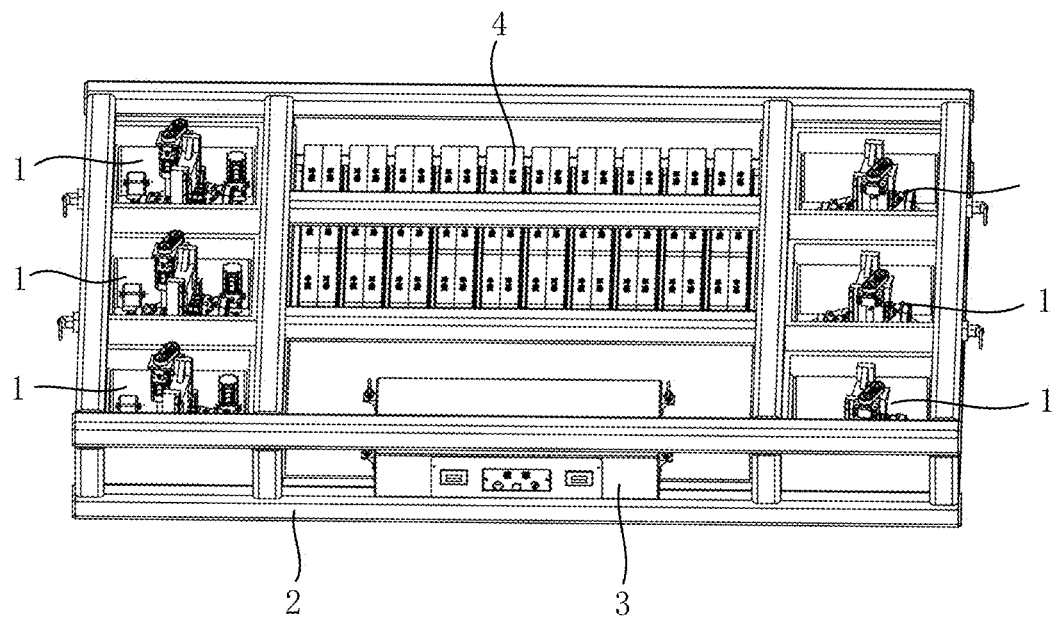
FIG. 13 is a schematic structural view of a six-leg parallel six-degree-of-freedom position-adjusting robot platform according to another embodiment of the present disclosure.
Figure 14:
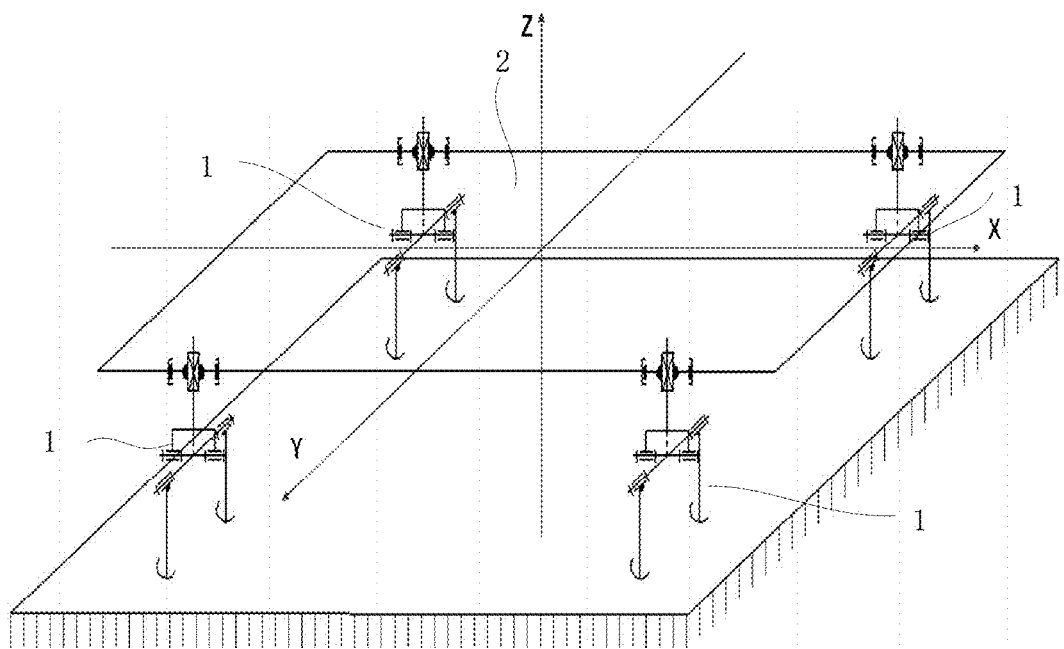
FIG. 14 is a structural principle view of a four-leg parallel six-degree-of-freedom position-adjusting robot platform mechanism according to another embodiment of the present disclosure.

As shown in FIG. 13, another embodiment of the six-degree-of-freedom position-adjusting robot platform provided by the present disclosure is illustrated. In this embodiment, the frame 2 is connected with six active-passive differential series-parallel connection supporting legs 1 respectively disposed at two ends or two sides of the frame 2. The number of the six-degree-of-freedom position-adjusting robot platform legs is increased to effectively improve the bearing capacity of the platform, and further improve the motion stability and the movement precision of the six-degree-of-freedom position-adjusting robot platform.

Figure 15:
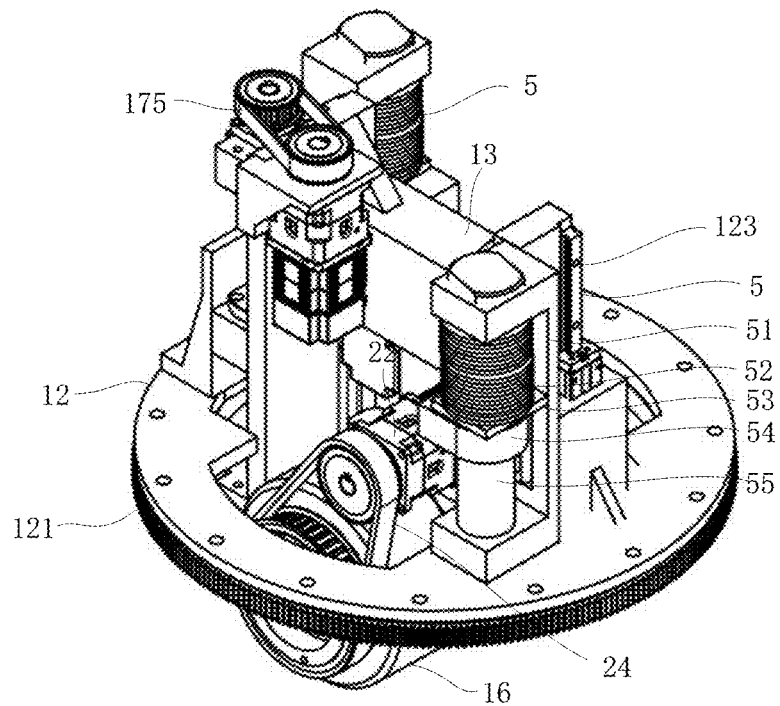
FIG. 15 is a schematic view illustrating an independent suspension structure of an active-passive differential series-parallel connection supporting leg according to one embodiment of the present disclosure.
Figure 16:
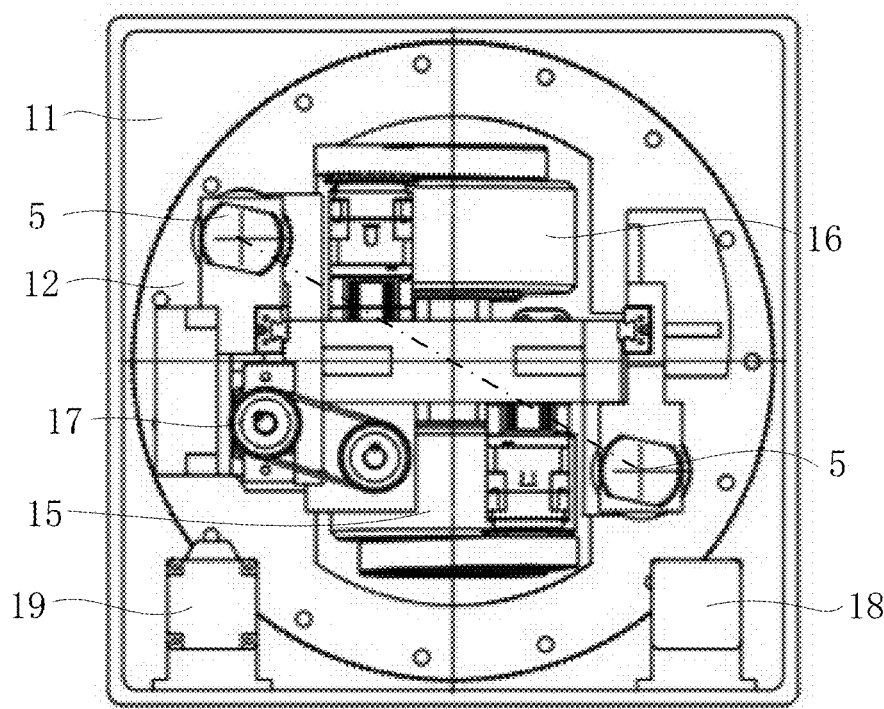
FIG. 16 is a schematic top view of an active-passive differential series-parallel connection supporting leg according to one embodiment of the present disclosure as shown in FIG. 15.
Figure 17:
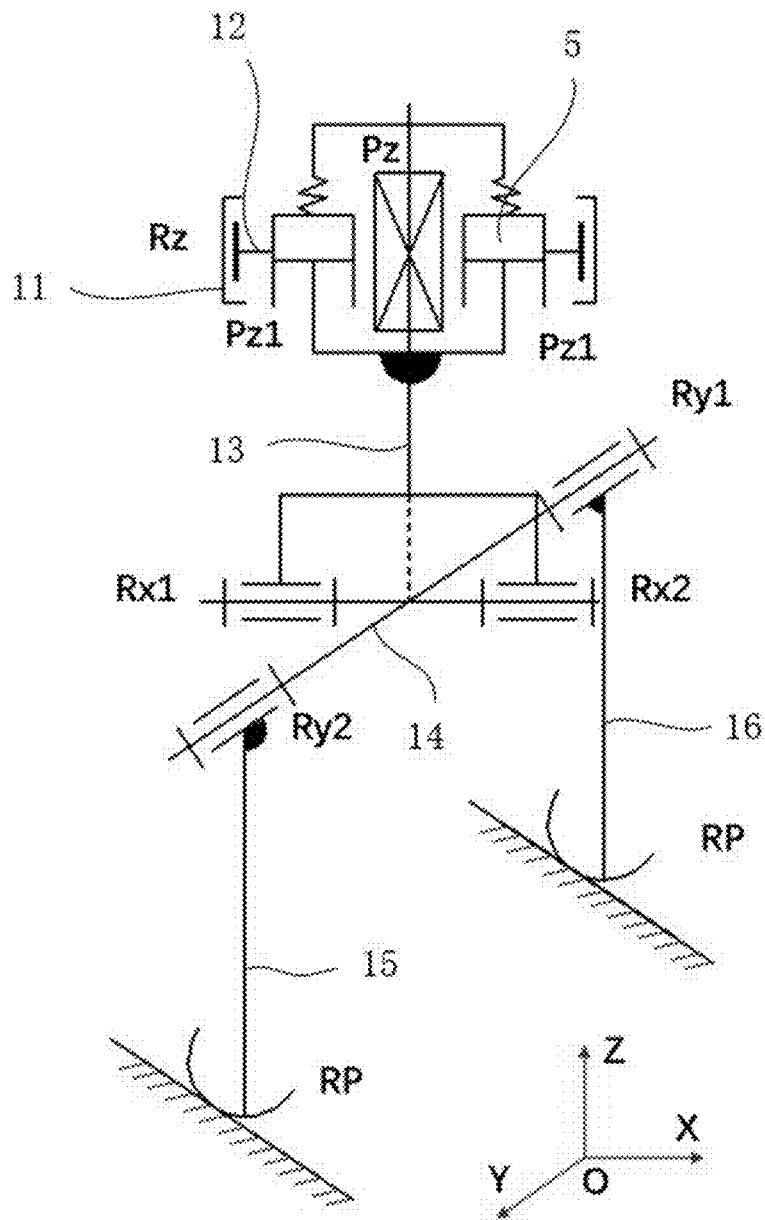
FIG. 17 is a structural principle view of an active-passive differential series-parallel connection supporting leg structure according to one embodiment of the present disclosure as shown in FIG. 15.

As shown in FIGS. 15, 16 and 17, in one embodiment, an independent suspension assembly 5 is arranged between the lifting table 13 and the steering table 12, wherein the independent suspension assembly 5 includes a suspension fixing plate 51, a spring 52, a spring collision block 53, a lifting collision block 54 and a guide column 55. The spring 52 can be reasonably selected from a compression spring, a belleville spring or an air spring according to a load and a suspension stroke.

FIG. 15 is a schematic structural view of an active-passive differential series-parallel connection supporting leg with an independent suspension assembly according to another embodiment of the present disclosure. The independent suspension assembly 5 connects the lifting table 13 and the steering table 12, arranged in two sets, and is in parallel relation with the Pz. The suspension fixing plate 5 is fixedly connected with the steering table 12. The spring 52 is fixedly connected with the spring collision block 53. The guide column 55 is fixedly connected with the suspension fixing plate 51, and penetrates through the spring 52 and the spring collision block 53 to form a sliding connection. The lifting collision block 53 is fixedly connected with the lifting table 13, and also is slidably connected with the guide column 55.

FIG. 16 is a schematic top view of the active-passive differential series-parallel connection supporting leg with the independent suspension according to another embodiment. The independent suspensions 5 are arranged in central symmetry relative to a rotary center of the rotary table 12, so that additional bending moment on the guide rail can be mutually offset, and additional load on the lifting guide rail cannot be increased.

FIG. 17 is a structural principle view of the active-passive differential series-parallel connection supporting leg structure with the independent suspension according to another embodiment. The spring 52 is compressed to form a lifting stroke which is smaller than that of the lifting table 13, the lifting motion and the independent suspension are in parallel connection relation, and a stroke L1 of the lifting motion is larger than a length L2 of the spring. When the lifting distance L1 of the lifting table 13 is greater than the length L2 of the spring 52, the series-parallel connection supporting leg 1 is a rigid active suspension vibration reduction controlled by a lifting motor 173. When the lifting distance of the lifting table 13 is less than the length of the spring 52, the lifting collision block 54 is in contact with the spring collision block 53, the contracting brake of the lifting motor 173 is opened, the series-parallel connection supporting leg 1 is flexible passive vibration reduction based on the independent suspension of the spring 52, and the compression spring can effectively reduce the load carried by the screw rod 172. When the compression amount of the spring is maximum, the load of the screw rod is zero; and the active and passive vibration reduction forms a rigid-flexible coupling vibration reduction structure.

It should be noted that the number of the supporting legs of the six-degree-of-freedom position-adjusting robot platform may be selected according to actual working conditions, which is not limited to the several embodiments shown in FIGS. 8 to 12. All the supporting legs have to meet the position condition that in the active-passive differential series-parallel connection supporting legs, the axes of the rotating pairs Rz are parallel to each other and the guide rails of the moving pair Pz are parallel to each other.

The Other Embodiment

This embodiment provides a gravity-based closing active-passive differential series-parallel connection supporting leg, including a base 110, a lifting table 120, a steering frame 130, a wheel seat 140, a first wheel 150, and a second wheel 160. The lifting table 120 is slidably connected with the base 110 to form a moving pair Pz, and the moving pair Pz is the active pair and is driven by a linear driver 170. The steering frame 130 is rotatably connected with the lifting table 120 to form a rotating pair Rz. The wheel base 140 is rotatably connected with the steering frame 130 to form a rotating pair Rx. The first wheel 150 and the second wheel 160 are respectively located on the first and second sides of the rotating pair Rx, the first wheel 150 is rotatably connected with the wheel base 140 to form a rotating pair Ry1, and the second wheel 160 is rotatably connected with the wheel seat 140 to form a rotating pair Ry2.

A linear guide rail of the moving pair Pz is parallel to an axis of the rotating pair Rz. The axis of the rotating pair Rz is staggered with and perpendicular to an axis of the rotating pair Rx. The axis of the rotating pair Rx is perpendicular or orthogonal to an axis of the rotating pair Ry1 or an axis of the rotating pair Ry2. The axis of the rotating pair Ry1 is coaxial with the axis of the rotating pair Ry2.

In actual use, the first wheel 150 and the second wheel 160 in the series-parallel connection supporting leg are in contact with the ground and perform pure rolling motion relative to the ground, or the wheels perform pure rolling along a certain point of the width. If the ground is regarded as a fixing platform, and the wheel base is regarded as a moving platform, the first wheel 150, the second wheel 160, the ground and the wheel base 140 form a partial parallel structure. Further, the base 110 is in series connected with the wheel seat 140 through the lifting table 120 and the steering frame 130 to form a gravity-based closing series-parallel connection supporting leg, and its mechanism configuration is PzRzRx (Ry1+Ry2) Rp.

The gravity-based closing series-parallel connection supporting leg also includes a steering motor. The steering frame 130 is provided with a steering motor 210 disposed on the lifting table 120. By setting the steering motor 210, axis directions of the wheels, that is directions of the axes of the rotating pair Py1 and the rotating pair Py2, in the series-parallel connection supporting leg can be actively changed.

In order to prevent the steering frame 130 from rotating under external interference force or the lifting of the series-parallel connection supporting leg and affecting the motion accuracy and multi-leg coordination of the series-parallel connection supporting leg, preferably, the lifting table 120 is provided with a contracting brake 190 or a clutch, instead of the steering motor, for locking the steering frame 130 to prevent it from rotating relative to the lifting table 120.

The lifting table 120 is also provided with an angle sensor 180 for detecting a rotation angle of the steering frame 130 relative to the lifting table 120 and for realizing coordinated control of the multi-leg movement, that is, for controlling or maintaining the state of multiple legs or the axis directions of the rotating pair Rx parallel to each other or forming a certain cooperation relationship to meet the requirements of the linear motion or steering, turning or curved track motion.

When the gravity-based closing series-parallel connection supporting leg is a driving leg, at least one of the first wheel 150 and the second wheel 160 is the driving wheel, that is, one is active and the other is passive or both wheels are active. Preferably, the driving wheels of the first wheel 150 and the second wheel 160 are directly driven by a walking motor 2210 or 2220, or are indirectly driven by the walking motor 2210 or 2220 in a transmission manner such as chains, pulleys, and gears. Alternatively, the first wheel 150 and the second wheel 160 are respectively driven by two walking motors 2210 and 2220 to form an active differential drive or indirectly driven by a single motor through a differential gear train.

The differential gear train includes a first bevel gear 2550 fixedly connected to the first wheel 150, a second bevel gear 2560 fixedly connected to the second wheel 160, and a planetary bevel gear 2540 simultaneously engaged with the first bevel gear 2550 and the second bevel gear 2560, a large bevel gear 2530, a driving bevel gear 2510 and a planetary carrier 2520. The planetary bevel gear 2540 is hinged to the planetary carrier 2520. The planetary carrier 2520 is fixedly connected to the large bevel gear 2530. The large bevel gear 2530 is rotatably connected with the wheel base 140 and can rotate freely, and is driven by the driving bevel gear 2510 engaged with it. The driving bevel gear 2510 is fixedly connected to an output shaft of the walking motor 2230. On the outer shell of the differential gear train, an equidistant distance relative to the second wheel 160 is the position that coincides with an output axis of the walking single motor 2230, and two sections of the rotating shaft are arranged symmetrically with respect to the axes of the first wheel 15 and the second wheel 16 perpendicularly intersecting with each other, and are rotatably connected with the lifting table 13 to form a rotating pair Rx. The motion states of the second wheel 16 is driven and controlled by the steering motor 210 and the walking single motor 2230.

Preferably, the linear driver 170 may be a ball screw rod, a nut in the ball screw rod is fixedly connected to the base 110, the screw rod in the ball screw rod is rotatably connected with the lifting table 120, and the screw rod is driven by the lifting motor 1730.

Preferably, the gravity-based closing series-parallel connection supporting leg is provided with an independent suspension assembly 50. The independent suspension assembly 50 includes a suspension fixing plate 510, a spring 520, a spring collision block 530, a lifting collision block 540 and a guide column 550. A compression stroke of the spring 520 is smaller than a lifting stroke of the lifting table 120, the lifting motion and the independent suspension are in parallel relation, and the lifting motion stroke is larger than a length of the spring 520. When the lifting distance of the lifting table 120 is greater than the length of the spring 520, the series-parallel connection supporting leg is a rigid active suspension vibration reduction controlled by a lifting motor 1730. When the lifting distance of the lifting table 120 is less than the length of the spring 520, the lifting collision block 540 is in contact with the spring collision block 530, the contracting brake of the lifting motor 1730 is opened, the series-parallel connection supporting leg is flexible passive vibration reduction based on the independent suspension of the spring 520. The active and passive vibration reduction forms a rigid-flexible coupling vibration reduction structure. The independent suspension assembly 50 and a rotary center of a rotary table are arranged in a central symmetry manner, so that additional bending moment on the linear guide rail 1120 is mutually offset, and additional load on the linear guide rail 1120 is not increased.

According to the second aspect of the present disclosure, an omnidirectional mobile precision position-adjusting platform is provided, including a frame 20, a controller 30, and any of the above three or four or six legs gravity-based closing series-parallel connection supporting legs 10. The base 110 in the series-parallel connection supporting leg 10 is fixedly connected with the frame 20. The guide rails of the moving pairs Pz in the series-parallel connection supporting legs 10 are parallel to each other. The axes of the rotating pairs Rz in the series-parallel connection supporting legs 10 are parallel to each other. Three legs in the six-degree-of-freedom movement precision position-adjusting platform with three legs are arranged in a triangular layout. Four legs of the four-leg six-degree-of-freedom movement precision position-adjusting platform are arranged in a square, rectangular or diamond layout. Six legs of the six-leg six-degree-of-freedom movement precision position-adjusting platform are arranged in a "日" layout.

Preferably, at least two of the gravity-based closing series-parallel connection supporting legs 10 in the six-degree-of-freedom movement precision position-adjusting platform are driving legs, that is, at least one of the steering motor 210, the linear driver 170, the first wheel 150 and the second wheels 160 is a driving wheel or all are driving wheels.

Preferably, a battery pack 40 is further provided inside the frame, to supply power for the controller and the respective series-parallel connection supporting legs in the frame when the external supply power is not provided.

Figure 18:
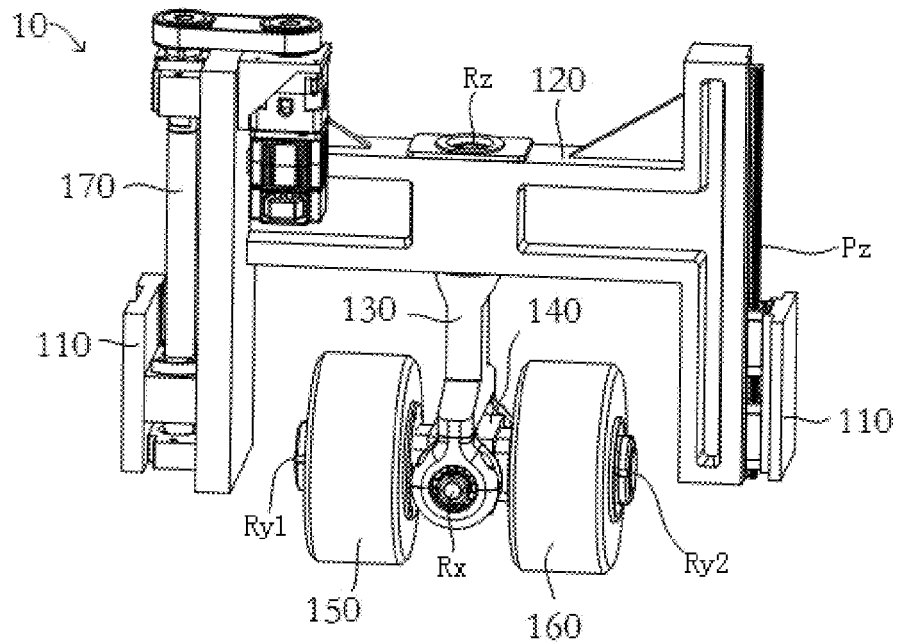
FIG. 18 is a structural view of a gravity-based closing series-parallel connection supporting leg according to one embodiment of the present disclosure.
Figure 19:
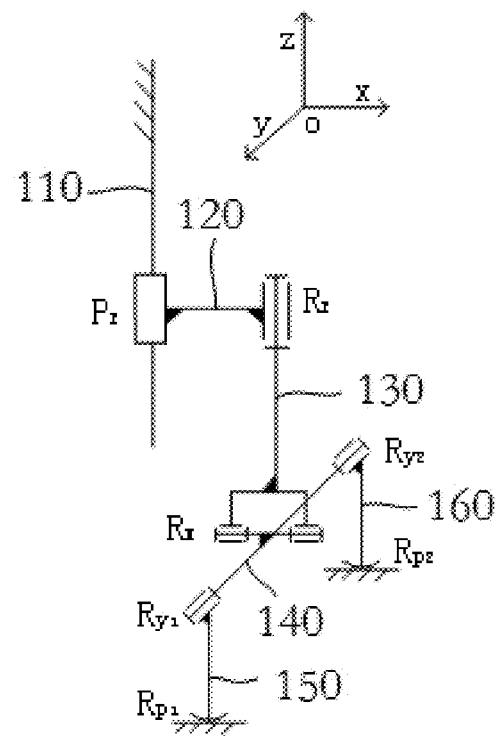
FIG. 19 is a structural principle view of a gravity-based closing series-parallel connection supporting leg according to one embodiment of the present disclosure.

As shown in FIGS. 18-19, it is illustrated that in the same rectangular coordinate system, a Z axis is perpendicular to a horizontal plane, an X axis and a Y axis are located within the horizontal plane, an axial direction of the first wheel and the second wheel is the Y axis, and a rolling direction is the X axis.

FIG. 18 is a schematic structural view of a gravity-based closing series-parallel connection supporting leg according to an exemplary embodiment of the present disclosure. FIG. 18 shows the specific structure of the series-parallel connection supporting leg 10. Referring to FIG. 19, the schematic view of the mechanism configuration of the series-parallel connection supporting leg 10 is shown. The series-parallel connection supporting leg 10 includes a base 110, a lifting table 120, a steering frame 130, a wheel seat 140, a first wheel 150, a second wheel 160 and a linear driver 170. The lifting table 120 is connected to the base 110. The lifting table 120 is slidable back and forth in a direction perpendicular to the base 110. The steering frame 130 is rotatably connected to the lifting table 120. The wheel base 140 is rotatably connected to the steering frame 130, and is driven to rotate by the steering frame, thereby driving the wheel to change the movement direction thereof.

The lifting table 120 is slidably connected with the base 110 to form a moving pair Pz. The moving pair Pz is an active moving pair and is driven by a linear driver 170. The steering frame 130 is rotatably connected with the lifting table 120 to form a rotating pair Rz. The wheel base 140 is rotatably connected with the steering frame 130 to form a rotating pair Rx. The first wheel 150 and the second wheel 160 are located on both sides of the rotating pair Rx. The first wheel 150 is rotatably connected with the wheel base 140 to form a rotating pair Ry1, and the second wheel 160 is rotatably connected with the wheel base 140 to form a rotating pair Ry2. The first wheel 150 contacts the ground to form a rolling pair Rp1, and the second wheel 160 contacts the ground to form a rolling pair Rp2.

The moving pairs formed between the respective parts in the series-parallel connection supporting leg 10 satisfies specific geometric relationship, wherein the guide rail direction of the moving pair Pz is parallel to the axis direction of the rotating pair Rz; the axis of the rotating pair Rz is perpendicular to the axis of the rotating pair Rx, and the axis of the rotating pair Rx is perpendicular to the axis of the rotating pair Ry1 or the rotating pair Ry2; and the axis of the rotating pair Ry1 is coaxial to the axis of the rotating pair Ry2.

The base 110 has a rectangular plate structure, the lifting table 120 has an H-shaped structural member, the steering frame 130 has a Y-shaped structural member, and the wheel base 140 has a cross-shaft structure. In the series-parallel connection supporting leg 10, the base 110 is movably connected with the lifting table 120 by a linear guide rail 1120; the lifting table 120 is rotatably connected with the steering frame 130; the steering frame 130 is rotatably connected with the wheel base 140; and the base 110, the lifting table 120, the steering frame 130 and the wheel base 140 are connected in series from top to bottom. The first wheel 150 and the second wheel 160 are simultaneously connected to the wheel base 140, and are respectively connected to the two ends of the cross-shaft structure of the wheel base 140 to form a rotating pair. The first wheel and the second wheel are in contact with the ground and form a partially parallel connection under the gravity-based closing condition, so the series-parallel connection supporting leg 10 is a series-parallel connection structure.

Figure 20:
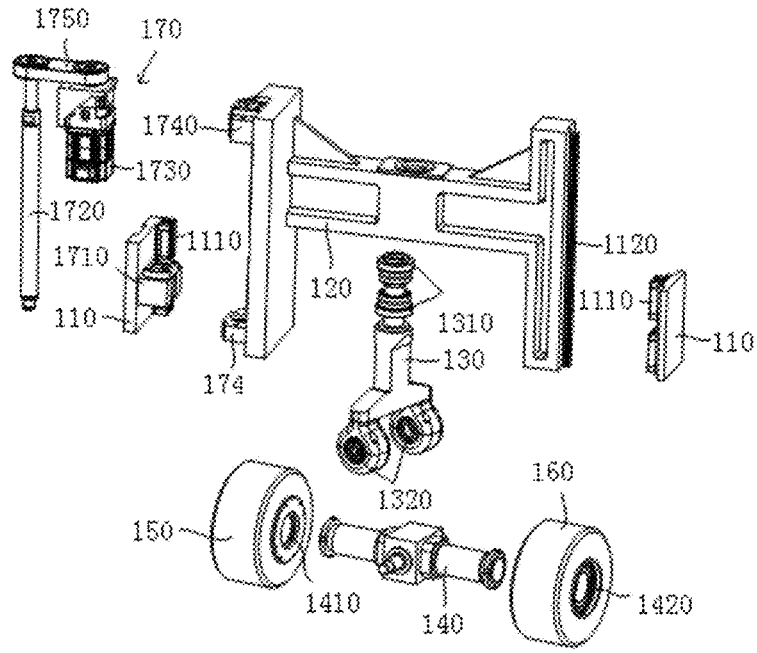
FIG. 20 is an exploded view of a gravity-based closing series-parallel connection supporting leg according to one embodiment of the present disclosure.
Figure 21:
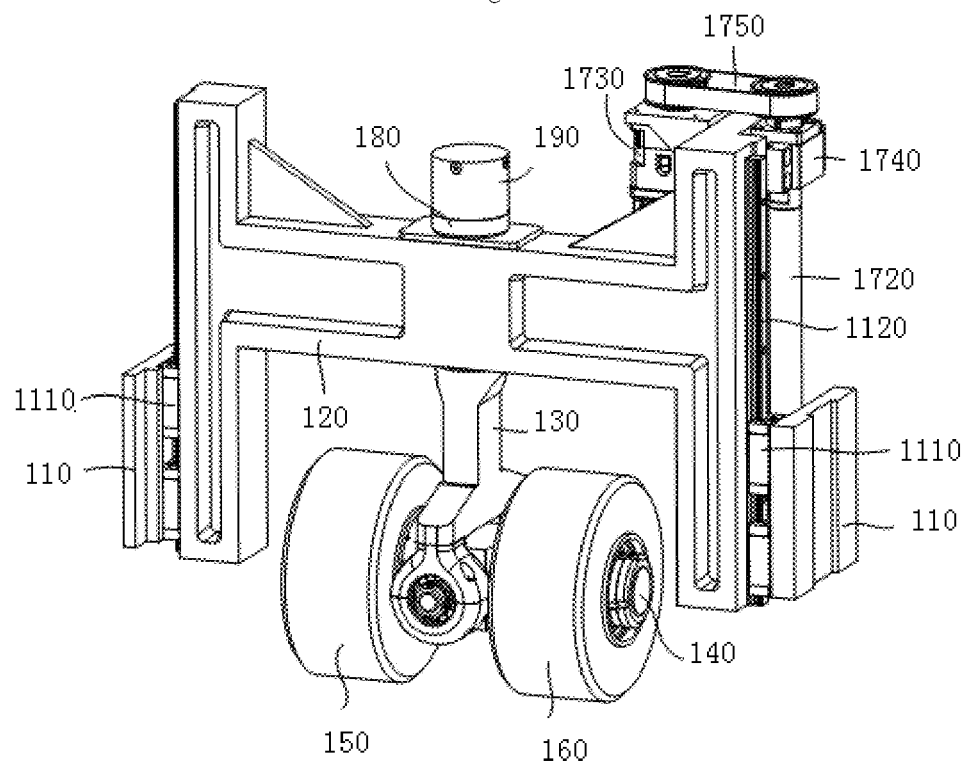
FIG. 21 is a schematic structural view of a gravity-based closing series-parallel connection supporting leg according to another embodiment of the present disclosure.

As shown in FIGS. 20 and 21, in one embodiment, the linear driver 170 is a ball screw rod, and the linear driver 170 includes a nut 1710, a screw rod 1720, a lifting motor 1730, a bearing seat 1740, and a synchronous belt 1750. 1710 is fixedly connected to the base 110. The bearing seats 1740 are provided on the two ends of the screw rod 1720, and are fixedly connected to one side of the lifting table 120. The screw rod 1720 is driven by the lifting motor 1730 through the synchronous belt 1750 and two synchronous pulleys. The linear driver 170 may also be selected from a hydraulic cylinder, a linear module, and other types of drives according to actual situations.

FIG. 20 is an exploded view of the series-parallel connection supporting leg provided by one embodiment of the present disclosure. In order to reduce friction force between the parts of the series-parallel connection supporting leg 10, the lifting table 120 is slidably connected with the base 110 by a sliding block 1110 and a linear guide rail 1120 to form a moving pair Pz; the sliding block 1110 is fixedly connected to the base 110; the linear guide rail 1120 is fixedly connected to the lifting table 120; a length direction of the linear guide rail is perpendicular to a table surface of the lifting table 120. A steering bearing 1310 is provided at the rotational connection of the steering frame 130 and the lifting table 120. A swing bearing 1320 is provided at the rotational connection of the wheel base 140 and the steering frame 130. A first wheel bearing 1410 is provided at the rotational connection of the first wheel 150 and the wheel base 140. A second wheel bearing 1420 is provided at the rotational connection between the second wheel 160 and the wheel seat 140. By arranging the sliding blocks and the linear guide rails at the moving pair Pz, and arranging the bearings at the rotating pair Rz, the rotating pair Rx, the rotating pair Ry1, and the rotating pair Ry2, the frictional resistance generated by the series-parallel connection supporting leg 10 during the movement can be effectively reduced.

As shown in FIG. 21, in one embodiment, the lifting table 120 is also provided with a contracting brake 190, and an output end of the contracting brake 190 is connected to the steering frame 130. The steering frame 130 can be controlled by the contracting brake 190 to rotate or lock relative to the lifting table 120, so as to avoid the steering frame 130 from rotating under external interference force or the lifting of the series-parallel connection supporting leg 10, which affects the motion accuracy and multi-leg state coordination of the series-parallel connection supporting leg 10. The contracting brake 190 can also be replaced by a clutch and the like. In order to improve the control accuracy of the series-parallel connection supporting leg 10, an angle sensor 180 can be optionally installed at the rotation connection of the steering frame 130 and the lifting table 120 to monitor the rotation angle of the steering frame 130 in real time and control and coordinate the direction and accuracy of the rotating pair Rx between the respective supporting legs.

Figure 22:
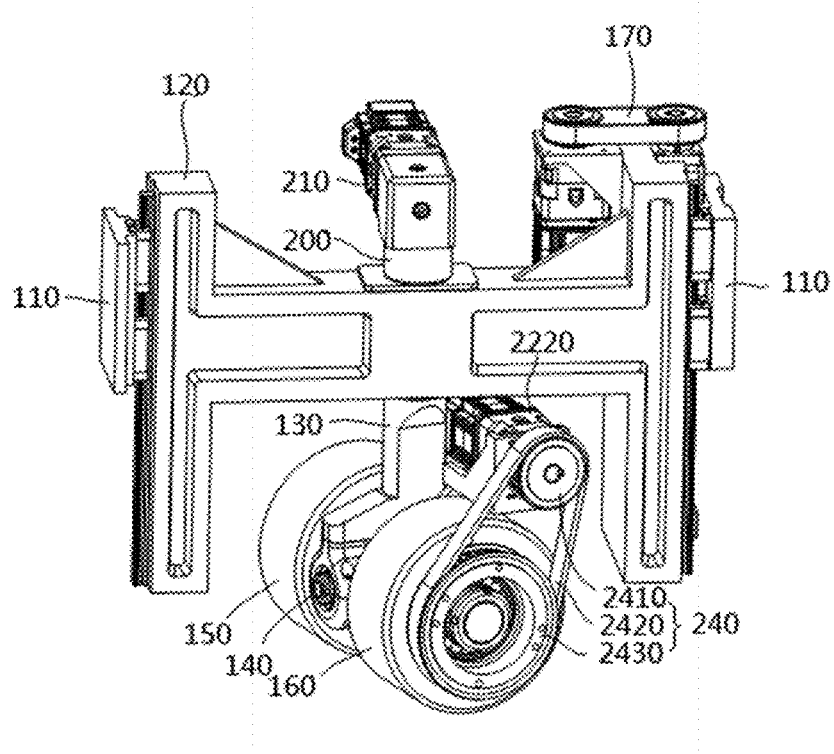
FIG. 22 is a schematic structural view of a gravity-based closing series-parallel connection supporting leg according to another embodiment of the present disclosure.

As shown in FIG. 22, in an alternative embodiment, the lifting table 120 is also provided with a steering motor 210, and the steering frame 130 is driven to rotate by the steering motor 210. The rotation direction of the steering frame 130 can be actively changed by controlling the steering motor 210, and furthermore, the traveling direction of the first wheel 150 and the second wheel 160 can be controlled. The output end of the steering motor 210 may be further provided with a first torque sensor 210 for monitoring the steering torque between the steering frame 130 and the lifting table 120 in real time.

When the series-parallel connection supporting leg 10 is a driving leg, at least one of the first wheel 150 and the second wheel 160 is a driving wheel or both wheels are driving wheels to form an active differential motion. As shown in FIG. 22, in an alternative embodiment, the second wheel 160 is a driving wheel, and is directly driven by the walking motor 2220, or indirectly driven by the walking motor 2220 in a transmission manner such as a chain, a pulley, a gear and the like. In the embodiment shown in FIG. 22, the second wheel 160 is indirectly driven by the walking motor 2220 through a pulley set 240. The walking motor 2220 is mounted on the wheel base 140. The pulley set 240 includes a first pulley 2410, a synchronous belt 2420, and a second pulley 2430. The first pulley 2410 is fixedly connected to the output shaft of the walking motor 2220, the second pulley 2430 is fixedly connected to one side of the second wheel 160, and the synchronous belt 2420 is mounted in cooperation with the first pulley 2410 and the second pulley 2430.

Figure 23:
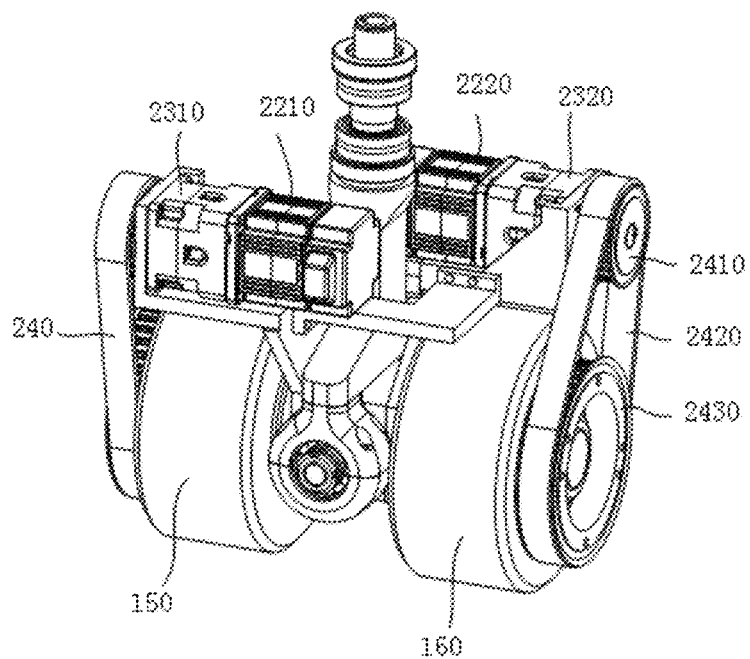
FIG. 23 is a schematic view of a wheel driving structure of a gravity-based closing series-parallel connection supporting leg according to another embodiment of the present disclosure.

As shown in FIG. 23, in an alternative embodiment, both the first wheel 150 and the second wheel 160 are driving wheels, and the first wheel 150 and the second wheel 160 are respectively driven by the two independent walking motors 2210, 2220. When the first wheel 150 and the second wheel 160 are driven by the two walking motors 2210 and 2220 to rotate in the same direction, the series-parallel connection supporting leg 10 can be driven forward. When the first wheel 150 and the second wheel 160 are driven by the two walking motors 2210 and 2220 to rotate in different directions, an active differential drive working state is formed such that the steering frame 130 rotates relative to the lifting table 120 to change the traveling direction of the series-parallel connection supporting leg 10. In order to further improve the control accuracy of the first wheel 150 and the second wheel 160, torque sensors may be installed at the output ends of the walking motors 2210 and 2220 to monitor the on-wheel torque of the first wheel 150 or the second wheel 160 in real time.

Figure 24:
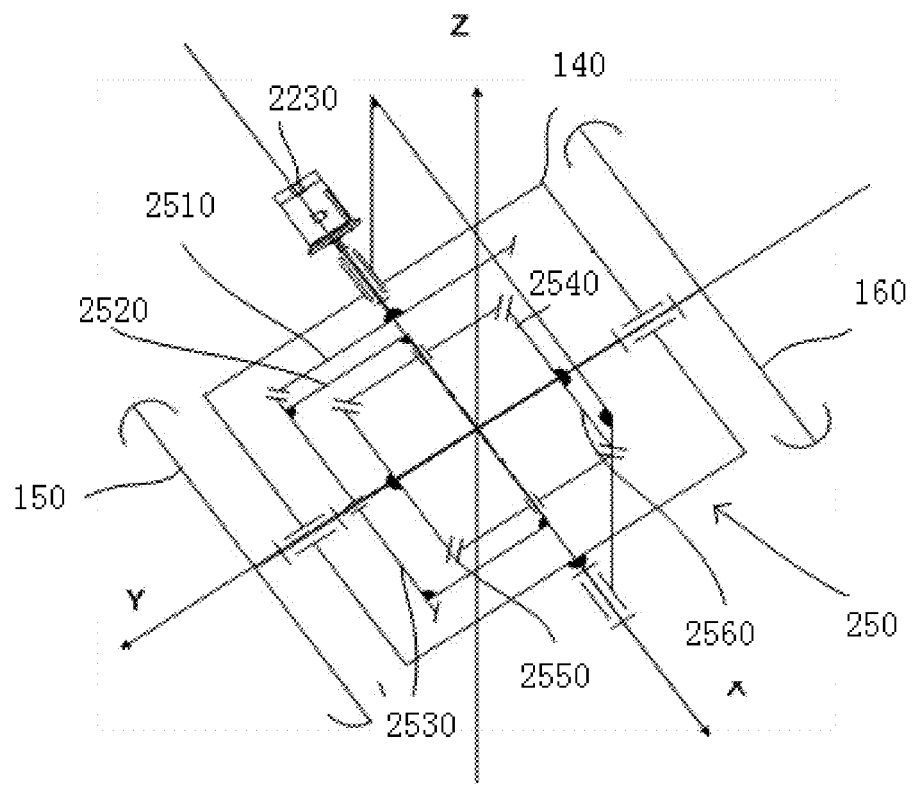
FIG. 24 is a wheel driving principle view of a gravity-based closing series-parallel connection supporting leg according to another embodiment of the present disclosure.

As shown in FIG. 24, in an alternative embodiment, the first wheel 150 and the second wheel 160 may be indirectly driven by the walking motor 2230 through a differential gear train 250. The first wheel 150 and the second wheel 160 are simultaneously driven by the walking motor 2230 to solve the problem of different or random rotation speeds of the first wheel 150 and the second wheel 160 during the steering process.

The differential gear train 250 includes a first bevel gear 2550 fixedly connected to the first wheel 150, a second bevel gear 2560 fixedly connected to the second wheel 160, and a planetary bevel gear 2540 simultaneously engaged with the first bevel gear 2550 and the second bevel gear 2560. The planetary bevel gear 2540 is rotatably connected with the planetary carrier 2520. The planetary carrier 2520 is fixedly connected to the large bevel gear 2530. The large bevel gear 2530 and a shaft of the wheel 150 form a rotational connection, and the large bevel gear 2530 is driven by the driving bevel gear 2510 engaged with it. The driving bevel gear 2510 is fixedly connected with an output shaft of the walking motor 2230. An axis of the first bevel gear 2550 fixedly connected to the first wheel 150 is coaxial with an axis of the second bevel gear 2560 fixedly connected to the second wheel 160, and they are supported on a housing of the planetary gear train through a rotating pair, equivalent to the wheel seat 140. The axes of the walking motor 2230 and the driving bevel gear 2510 are coaxial with the axis of the planetary bevel gear 254. Two sections of the rotating shaft are provided on the outer surface of the wheel seat 140 to form a rotation connection with the lifting table 120, that is, to form a rotating pair Rx and is coaxial with the axis of the planetary bevel gear 254. One end of the rotating pair Rx coincides with an output axis of the walking motor 2230, to form a composite rotating pair with the motor shaft inside and Rx outside. The second torque sensors 2310 and 2320 are provided on the output ends of the walking motors 2210 and 2220.

Figure 25:
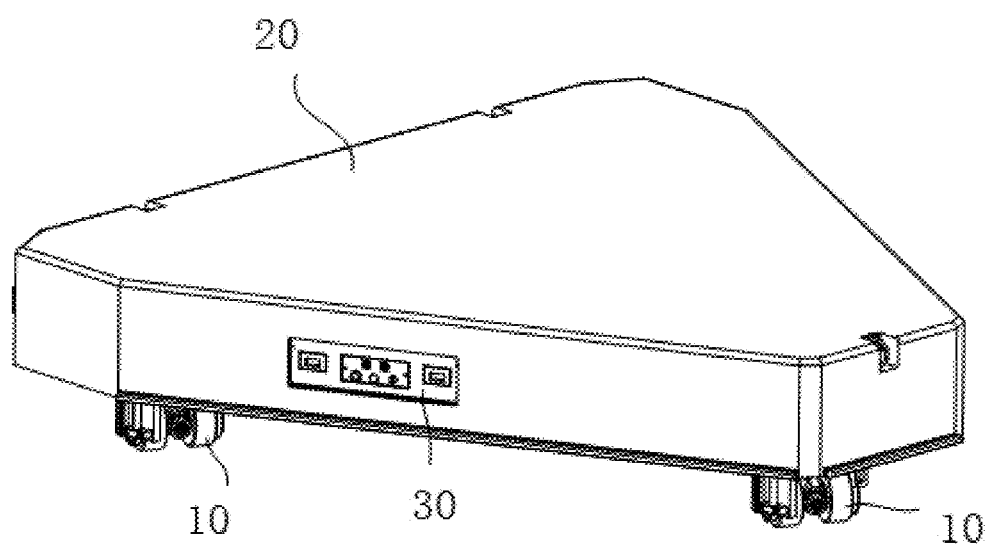
FIG. 25 is a schematic structural view of a mobile position-adjusting platform according to one embodiment of the present disclosure.
Figure 26:
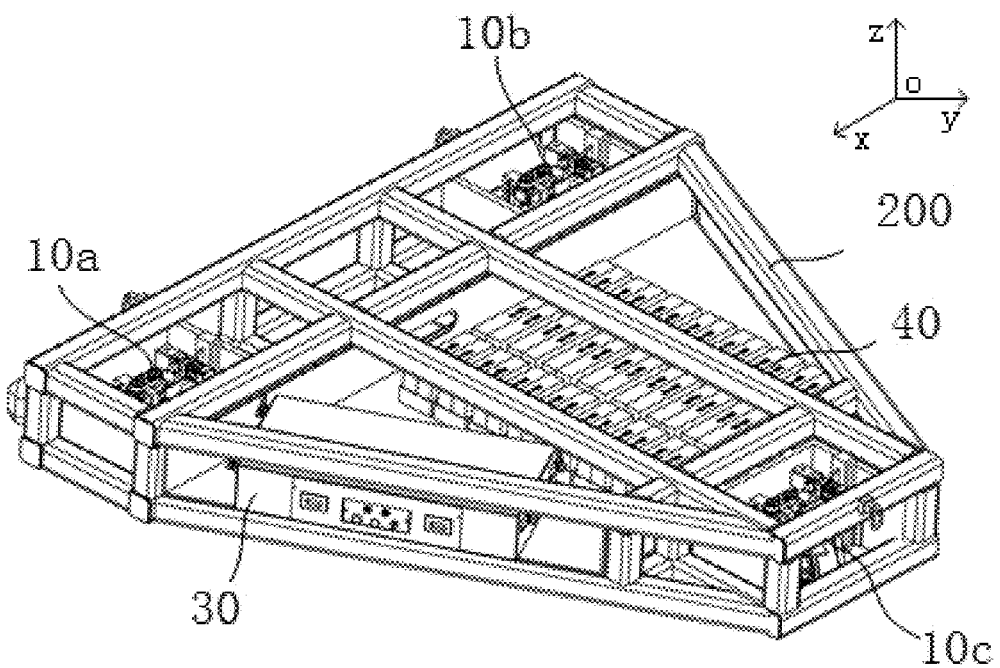
FIG. 26 is a schematic view of an internal structure of the mobile position-adjusting platform as shown in FIG. 25.

As shown in FIGS. 25 and FIG. 26, an embodiment of the mobile precision position-adjusting platform provided by the present disclosure is illustrated. The mobile precision position-adjusting platform includes a frame 20, and three series-parallel connection supporting legs 10. In the series-parallel connection branch chain, the base 110 is fixedly connected to the frame 20. The three series-parallel connection supporting legs 10 are arranged in a triangle and are controlled by the controller 30 inside the frame 20. Two or three of the three series-parallel connection supporting legs 10 can be the driving legs. At least one of the first wheel 150 or the second wheel 160 in the driving legs is a driving wheel or both wheels are the driving wheels, which can be driven simultaneously and independently by the driving motor 221 or 222. The frame 20 is a frame structure welded by profiles, which can effectively improve the carrying capacity of the frame 20, and a decorative plate is mounted on the outer peripheral surface of the frame 20. The three series-parallel connection supporting legs 10 (i.e., 10a, 10b, and 10c) should meet the position constraint condition. The position condition refers to that in the series-parallel connection supporting legs, the guide rails of the moving pairs Pz are parallel to each other and the axes of the rotating pairs Rz are parallel to each other.

Further, in order to improve the application scope of the mobile position-adjusting platform, in addition to the external power supply frame 20, there is also a battery pack 40, which is used to supply power to the controller 30 and the series-parallel connection supporting leg 10, such that the mobile precision position-adjusting platform can still work normally without external power supply.

The mobile precision position-adjusting platform has a carrying function of an ordinary carrier vehicle, which can move in any direction along the ground and rotate around the direction perpendicular to the ground. At the same time, the mobile precision position-adjusting platform also has the function of adjusting the spatial position of the frame 20. By controlling the linear drives 170 in the three series-parallel connection supporting leg 10 to move up and down synchronously, the lifting motion of the frame 20 can be realized. When the linear drivers 170 in the three series-parallel connection supporting leg 10 move asynchronously, the frame 20 can be tilted relative to the ground, that is to realize pitching and rolling motions.

Specifically, as shown in FIG. 26, in order to distinguish the series-parallel connection supporting legs, the series-parallel connection supporting legs in different positions are named as 10a, 10b, and 10c, respectively. When the series-parallel connection supporting legs 1a and 1b are controlled to be raised and the series-parallel connection supporting leg 10c is lowered, the frame 2 can rotate around the X axis; and of course, when the series-parallel connection supporting legs 10a and 10b can be lowered and the series-parallel connection supporting leg 10c is raised, the frame 20 can reversely rotate around the X axis. When the series-parallel connection supporting leg 10a is controlled to be raised or lowered, and the series-parallel connection supporting leg 10b is accordingly lowered or raised, the frame 20 can rotate around the Y axis.

The above is merely a brief description of the position adjustment and control of the frame 20. In the actual control, when the position of the frame 20 is changed, the first wheel 150 and the second wheel 160 in the series-parallel connection supporting leg are moved accordingly. When the ground is used as a fixing platform, the rolling pairs Rp1 and Rp2 formed by contacting the first wheel 150 and the second wheel 160 with the ground participate in constructing the freedom degrees of the frame 20, so that the first wheel 150 and the second wheel 160 are controlled to perform corresponding micro motion compensation when the position of the frame 20 is adjusted.

Figure 27:
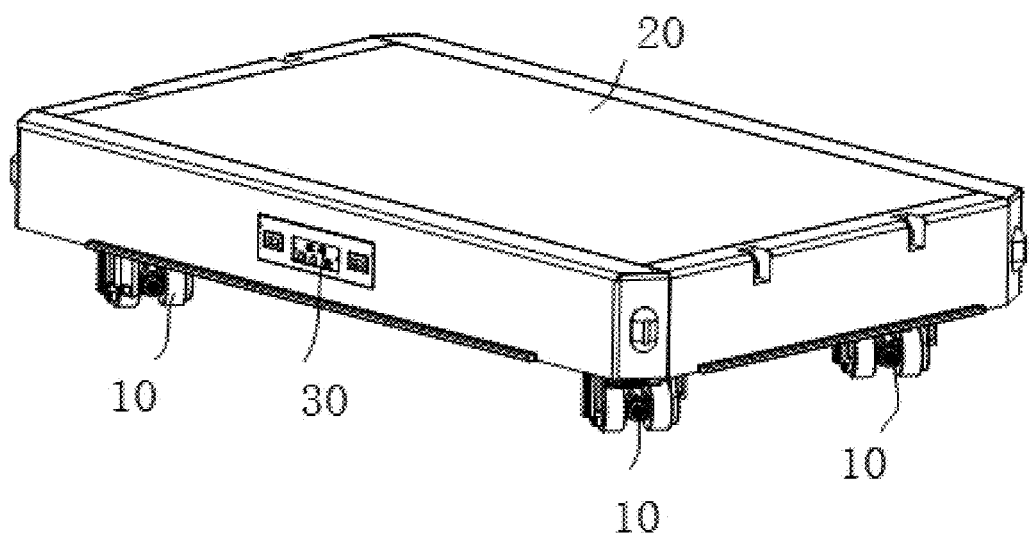
FIG. 27 is a schematic view of a mobile position-adjusting platform according to another embodiment of the present disclosure.
Figure 28:
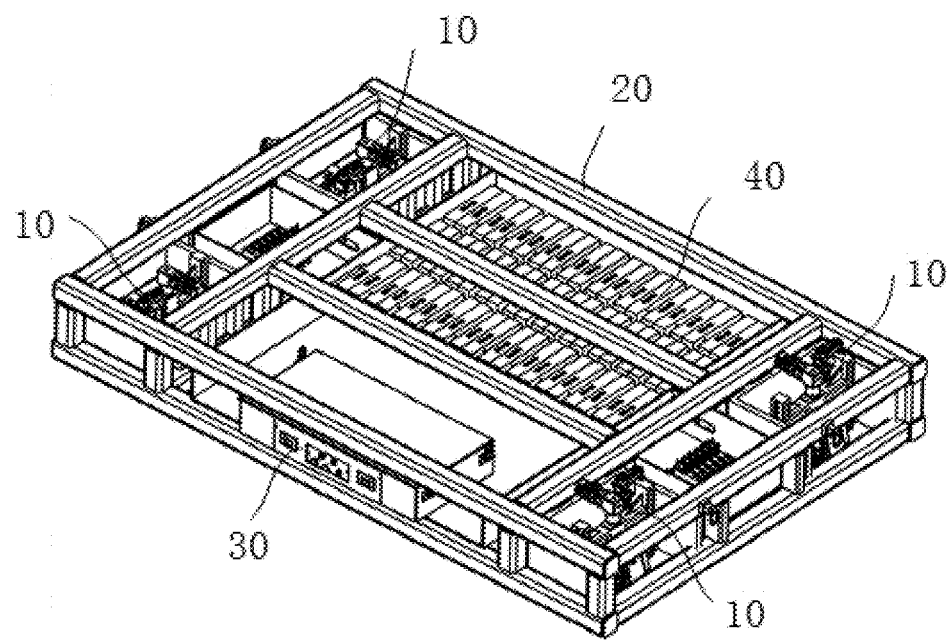
FIG. 28 is a schematic view of the internal structure of the mobile position-adjusting platform shown in FIG. 27.
Figure 30:
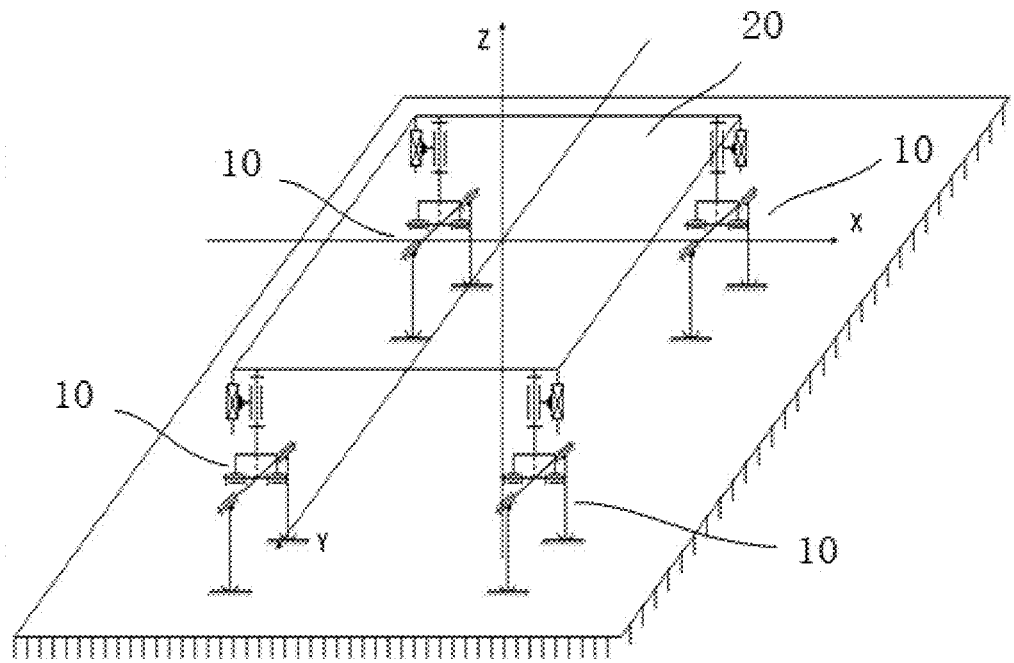
FIG. 30 is a mechanism configuration view of a mobile position-adjusting platform according to another embodiment of the present disclosure.

As shown in FIG. 27, FIG. 28, and FIG. 30, another embodiment of the mobile precision position-adjusting platform provided by the present disclosure is illustrated. In this embodiment, four series-parallel connection supporting legs 10 are connected to the frame 20, respectively arranged on the four corners of the frame 20, and are arranged in a square or rectangular shape. By arranging the four series-parallel connection supporting legs 10, a bearing area of the mobile precision position-adjusting platform can be effectively increased. Two or three or four of the series-parallel connection supporting legs 10 are the driving legs. The four series-parallel connection supporting legs should meet the position and posture constraint condition. The posture condition refers to that in the series-parallel connection supporting legs, the guide rails of the moving pairs Pz are parallel to each other and the axes of the rotating pairs Rz are parallel to each other.

In this embodiment, one of the four series-parallel connection supporting legs 10 is a redundant supporting leg. The redundant supporting leg is provided, on the one hand, the bearing capacity of the mobile position-adjusting platform can be improved, and on the other hand, stability of the mobile precision position-adjusting platform can be improved. When one of the four active-passive differential series-parallel connection supporting legs has a fault, the redundant supporting leg can replace the fault supporting leg to continue working or be maintained for a short time so that the normal working of the six-freedom-degree position adjusting platform cannot be influenced. It is important for the safety of installing and docking the important products such as satellites, rockets and the like.

The frame 20 can also be provided with the sensors such as cameras, ultrasonic, lidar, millimeter wave radar to improve the sensing capacity of the mobile precision position-adjusting platform to the external environment. The frame 20 can also be provided with vertical lifting table or functional mechanism or robot to further expand the application scope of the mobile precision position-adjusting platform.

Figure 29:
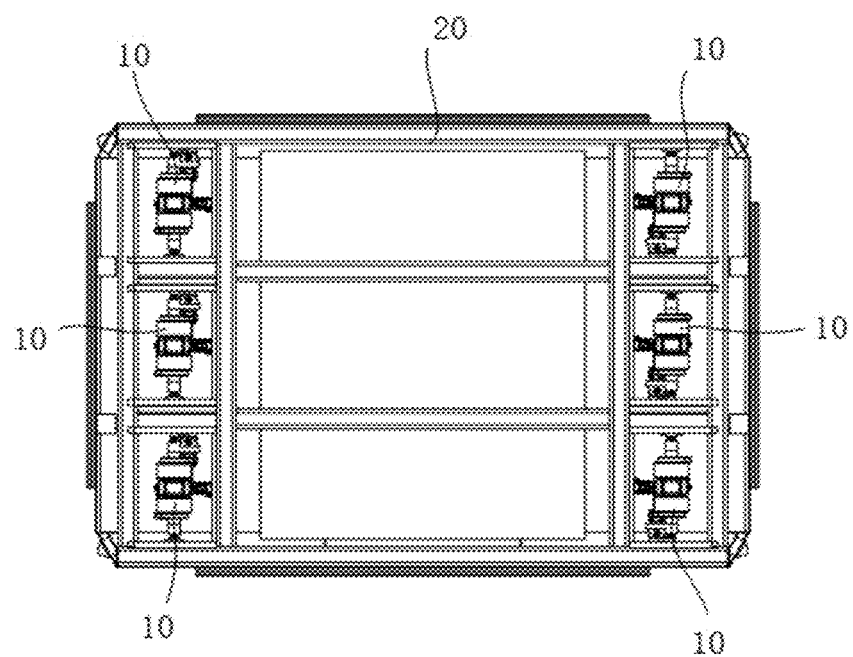
FIG. 29 is a schematic structural view of a mobile position-adjusting platform according to another embodiment of the present disclosure.

FIG. 29 is another embodiment of the mobile precision position-adjusting platform provided by the present disclosure. In this embodiment, six series-parallel connection supporting legs 10 are connected to the frame 20 and are respectively arranged at both ends or both sides of the frame 20. The number of the supporting legs of the mobile precision position-adjusting platform is increased to effectively improve the bearing capacity of the platform, and further improve the stability and reliability of the mobile position-adjusting platform. This embodiment is aimed at precise position adjustment, docking and installation for heavy load conditions, such as launch vehicles, large transport aircraft, and heavy machinery.

Figure 31:
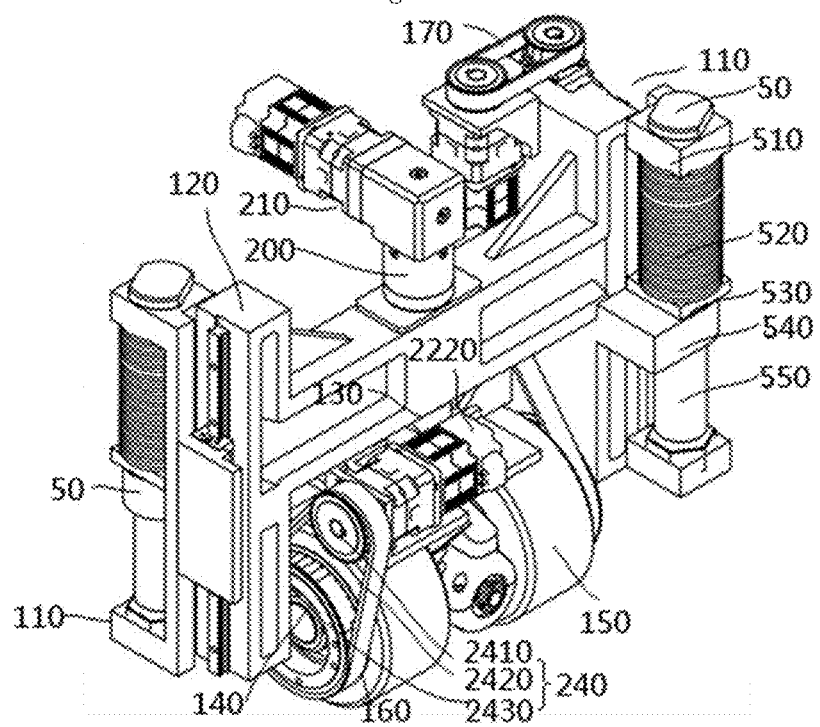
FIG. 31 is a schematic structural view of a gravity-based closing series-parallel connection supporting leg with an independent suspension assembly according to another embodiment of the present disclosure.
Figure 32:
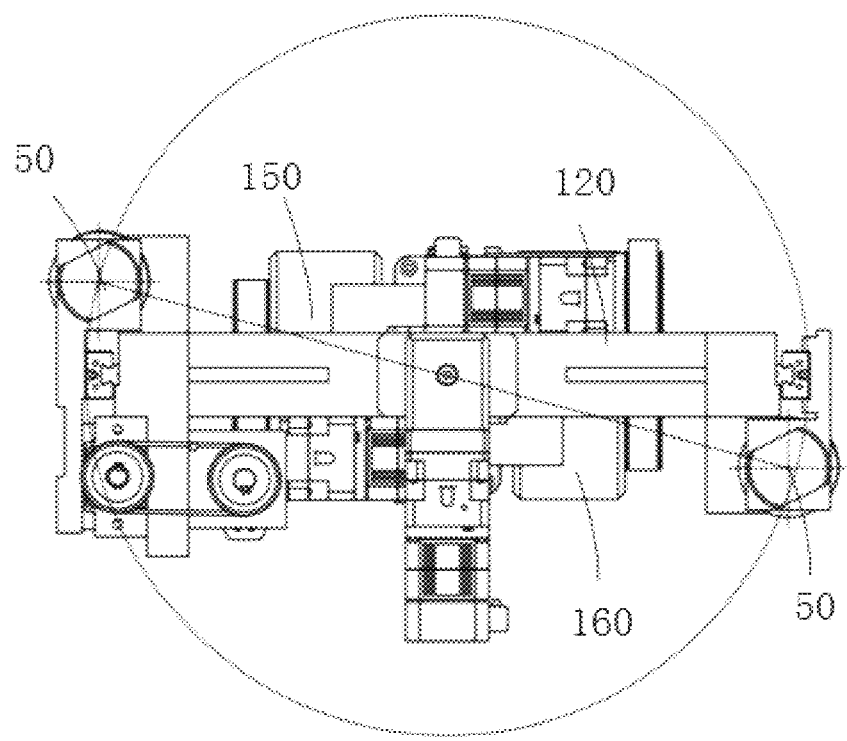
FIG. 32 is a schematic top view of the gravity-based closing series-parallel connection supporting leg with the independent suspension assembly as illustrated in the fourth embodiment.
Figure 33:
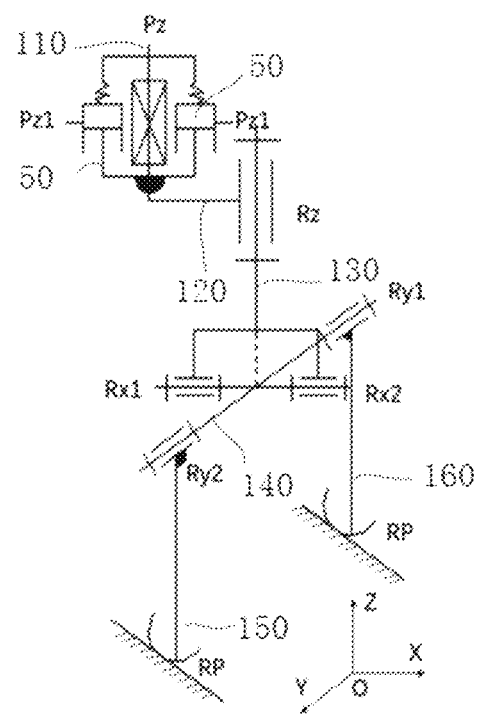
FIG. 33 is a structural principle view of the gravity-based closing series-parallel connection supporting leg with the independent suspension assembly as illustrated in the fourth embodiment.

As shown in FIGS. 31, 32 and 33, in one embodiment, an independent suspension assembly 50 is arranged between the lifting table 120 and the steering frame 130, wherein the independent suspension assembly 50 includes a suspension fixing plate 510, a spring 520, a spring collision block 530, a lifting collision block 540 and a guide column 550. The spring 520 can be reasonably selected from a compression spring, a belleville spring or an air spring according to a load and a suspension stroke.

FIG. 31 is a schematic structural view of a gravity-based closing series-parallel connection supporting leg with an independent suspension assembly according to another embodiment of the present disclosure. The independent suspension assembly 50 connects the lifting table 120 and the steering frame 130, arranged in two sets, and is in parallel relation with the Pz. The suspension fixing plate 5 is fixedly connected with the steering frame 130. The spring 520 is fixedly connected with the spring collision block 530. The guide column 550 is fixedly connected with the suspension fixing plate 510, and penetrates through the spring 520 and the spring collision block 530 to form a sliding connection. The lifting collision block 540 is fixedly connected with the lifting table 120, and also is slidably connected with the guide column 550.

FIG. 32 is a schematic top view of the gravity-based closing series-parallel connection supporting leg with the independent suspension according to another embodiment. The independent suspensions 5 are arranged in central symmetry relative to a rotary center of the rotary table 12, so that additional bending moment on the guide rail can be mutually offset, and additional load on the lifting guide rail cannot be increased.

FIG. 33 is a structural principle view of the gravity-based closing series-parallel connection supporting leg structure with the independent suspension according to another embodiment. The spring 520 is compressed to form a lifting stroke which is smaller than that of the lifting table 120, the lifting motion and the independent suspension are in parallel connection relation, and a stroke L1 of the lifting motion is larger than a length L2 of the spring. When the lifting distance L1 of the lifting table 120 is greater than the length L2 of the spring 520, the series-parallel connection supporting leg 1 is a rigid active suspension vibration reduction controlled by a lifting motor 173. When the lifting distance of the lifting table 120 is less than the length of the spring 520, the lifting collision block 540 is in contact with the spring collision block 530, the contracting brake of the lifting motor 173 is opened, the series-parallel connection supporting leg 1 is flexible passive vibration reduction based on the independent suspension of the spring 520, and the compression spring can effectively reduce the load carried by the screw rod 172. When the compression amount of the spring is maximum, the load of the screw rod is zero; and the active and passive vibration reduction forms a rigid-flexible coupling vibration reduction structure.

Finally, it should be noted that the above-mentioned embodiments are only used to illustrate the technical solution of the present disclosure, rather than limit the present disclosure. Although the present disclosure has been described in detail with reference to the foregoing embodiments, it should be understood by the person skilled in the art that it is allowable to modify the technical solution described in the foregoing embodiments or equivalently substituting some or all of the technical features; however, these modifications or substitutions do not cause the corresponding technical solutions to substantively depart from the scope of the technical solutions of various embodiments of the present disclosure.

What is claimed is:

1. An active-passive differential series-parallel connection supporting leg, comprising a base, a lifting table, a wheel seat and an independent suspension assembly, wherein the base is rotatably connected with a steering table through a turntable bearing; gear teeth are arranged on a periphery of the turntable bearing; a steering motor is arranged in the base; and a driving gear on an output shaft of the steering motor is matched with the gear teeth to rotate and position the steering table;

the lifting table is provided with a guide rail, the steering table is provided with a sliding block, the lifting table is fixedly connected with a lifting motor, and the lifting motor drives a linear driver to act through transmission of a synchronous belt, so as to drive the sliding block to be matched with the guide rail such that the lifting table is slidably connected with the steering table;

the wheel seat is rotationally connected with the lifting table, and a swing bearing is arranged at a rotary connection of the wheel seat and the lifting table; the wheel seat is provided with a first wheel and a second wheel rotatably connected with each other; at least one of the first wheel and the second wheel is a driving wheel, or both the first wheel and the second wheel are driving wheels; rotary motions of the first wheel and the second wheel are respectively actively driven synchronously or differentially by a walking double-motor reducer or is indirectly driven by a walking single motor through a differential gear train; and the independent suspension assembly is arranged between the lifting table and the steering table and comprises a suspension fixing plate, a spring, a spring collision block, a lifting collision block and a guide column; in the independent suspension assembly, a compression stroke of the spring is smaller than a lifting stroke of the lifting table; lifting motion and independent suspension are in parallel, and a stroke of the lifting motion is larger than a length of the spring; when a lifting distance of the lifting table is larger than the length of the spring, a rigid active vibration reduction controlled by the lifting motor is realized; when the lifting distance of the lifting table is smaller than the length of the spring, the lifting collision block is in contact with the spring collision block, a contracting brake of the lifting motor is opened, passive vibration reduction is realized due to flexibility of the independent suspension based on the spring, and the active vibration reduction and the passive vibration reduction form a rigid-flexible coupling vibration reduction structure.

2. The active-passive differential series-parallel connection supporting leg according to claim 1, wherein the linear driver comprises a nut, a screw rod, a lifting motor, a bearing seat and a synchronous belt; the nut is fixedly connected with the steering table; the bearing seat is arranged at each end of the screw rod; the bearing seat is fixedly connected with the lifting table; and the lifting motor drives the screw rod to move through the synchronous belt so as to realize the lifting of the lifting table; the lifting motor is fixedly connected to the lifting table; an output shaft of the lifting motor is connected with a driving pulley; a driven pulley is driven to move through the synchronous belt and is connected with the input end of the linear driver; and the input end is the screw rod.

3. The active-passive differential series-parallel connection supporting leg according to claim 2, wherein the differential gear train comprises a first bevel gear fixedly connected with the first wheel, a second bevel gear fixedly connected with the second wheel, and a planetary bevel gear engaged with the first bevel gear and the second bevel gear; the planetary bevel gear is hinged on a planetary carrier that is fixedly connected with an end face of a large bevel gear; the large bevel gear is rotationally connected with the wheel seat, and is driven by a driving bevel gear engaged with the large bevel gear; the driving bevel gear is fixedly connected with an output shaft of the walking single motor; two rotating pairs are symmetrically arranged on an outer shell of the differential gear train at the position overlapped with an output axis of the walking single motor and are vertically intersected with an axis of the first wheel and an axis of the second wheel, and the wheel seat is rotary connection with the lifting table so as to form a rotating pair Rx.

4. A six-degree-of-freedom position-adjusting robot platform with the active-passive differential series-parallel connection supporting leg according to claim 1, comprising a frame, a controller and a plurality of active-passive differential series-parallel connection supporting legs; in which,
the frame is fixedly connected with bases in the active-passive differential series-parallel connection supporting legs;
the frame is provided with a battery pack for supplying power to the controller and the active-passive differential series-parallel connection supporting legs;
rotation axes of the rotating tables in the active-passive differential series-parallel connection supporting legs are parallel to each other; linear guide rails of the lifting tables in active-passive differential series-parallel connection supporting legs are parallel to each other; at least two of the active-passive differential series-parallel connection supporting legs are driving legs; the steering motor and the linear driver are active drives; and at least one of the first wheel and the second wheel is a driving wheel or both of the first wheel and the second wheel are driving wheels; the first wheel and the second wheel of the active-passive differential series-parallel connection supporting legs fixedly connected with the frame are in contact with a ground, and have no freedom degree in a direction perpendicular to the ground at contact points; and the frame, the active-passive differential series-parallel connection supporting legs fixedly connected with the frame and the ground form a six-degree-of-freedom position-adjusting robot platform.

5. The six-degree-of-freedom position-adjusting robot platform according to claim 4, wherein when the number of the active-passive differential series-parallel connection supporting legs is three, the bases of the active-passive differential series-parallel connection supporting legs are fixedly connected to the frame, respectively; and the three active-passive differential series-parallel connection supporting legs are arranged in a triangle;
or when the number of the active-passive differential series-parallel connection supporting legs is four, the active-passive differential series-parallel connection supporting legs are respectively arranged on four corners of the frame, and two or three or four of the active-passive differential series-parallel connection supporting legs are driving legs;
or when the number of the active-passive differential series-parallel connection supporting legs is six, the active-passive differential series-parallel connection supporting legs are respectively arranged on the two ends or two sides of the frame and arranged in a "Two stacked squares" shape.

6. The six-degree-of-freedom position-adjusting robot platform according to claim 4, wherein cameras, ultrasonic waves, laser radars or millimeter wave radars are mounted or carried around the frame to improve a sensing capability of the six-degree-of-freedom position-adjusting robot platform to an external environment, and a vertical lifting table or a robot is further carried on the frame so that an application range is expanded.

7. A gravity-based closing series-parallel connection supporting leg, comprising a lifting table, a steering frame, a wheel seat and a wheel, in which a base is successively in series connected to a linear driver, the lifting table, the steering frame and the wheel seat, to form a partial parallel connection under a gravity closing condition;
the wheel includes a first wheel and a second wheel respectively located on two sides of a wheel frame, the first wheel is rotatably connected with the wheel seat to form a rotating pair Ry1; the second wheel is rotatably connected with the wheel seat to form a rotating pair Ry2; there is no freedom degree in a vertical direction between the wheel and the ground; and
the lifting table is slidably connected with the base to form a moving pair Pz as a active pair, the lifting table is driven by the linear driver; the steering frame is driven by a steering motor arranged on the lifting table to form a rotary connection, the steering frame is rotatably connected with the lifting table to form a rotating pair Rz; the wheel seat is rotatably connected with the steering frame to form a rotating pair Rx; a linear guide rail of the lifting table is parallel to an axis of the rotating pair Rz, and an axis of the rotating pair Rz is perpendicular to an axis of the rotating pair Rx; the axis of the rotating pair Ry1 and the axis of the rotating pair Ry2 are coaxial; the axis of the rotating pair Rx perpendicularly intersects with the axis of the rotating pair Ry1 and the axis of the rotating pair Ry2; and the axis of the rotating pair Rz passes through intersection points between the axis of the rotating pair Rx and the axis of the rotating pair Ry1 as well as the axis of the rotating pair Ry2.

8. The gravity-based closing series-parallel connection supporting leg according to claim 7, wherein as being a driving leg, the second wheel is a driving wheel, or the first wheel and the second wheel are driving wheels so as to constitute an active differential motion; when the second wheel is the driving wheel, the second wheel is directly driven by a walking motor or indirectly driven by the walking motor through a transmission mechanism; when the second wheel is indirectly driven by the walking motor through a pulley set, the walking motor is installed on the wheel seat; the pulley set includes a first pulley, a synchronous belt, and a second pulley, in which the first pulley is fixedly connected to an output shaft of the walking motor; the second pulley is fixedly connected to a side of the second wheel; and the synchronous belt is fitted on the first pulley and the second pulley in cooperation; or, when the first wheel and the second wheel are driving wheels, the first wheel and the second wheel are respectively driven by two independent walking motors; when the first wheel and the second wheel are driven to rotate in the same direction by the two independent walking motors, the first wheel and the second wheel move forward; and when the first wheel and the second wheel are driven to rotate in different directions by the two walking motors, an active differential drive working state is formed, so that the steering frame rotates relative to the lifting table to change traveling directions of the first wheel and the second wheel.

9. The gravity-based closing series-parallel connection supporting leg according to claim 7, wherein the gravity-based closing series-parallel connection supporting leg further comprises an independent suspension assembly arranged between the lifting table and the steering frame; the independent suspension assembly includes a suspension fixing plate, a spring, a spring collision block, a lifting collision block and a guide column, for connecting the lifting table with the steering frame; in the independent suspension assembly, a compression stroke of the spring is smaller than a lifting stroke of the lifting table; lifting motion and independent suspension are in parallel, and a stroke of the lifting motion is larger than a length of the spring; when a lifting distance of the lifting table is larger than the length of the spring, a rigid active vibration reduction controlled by the lifting motor is realized; when the lifting distance of the lifting table is smaller than the length of the spring, the lifting collision block is in contact with the spring collision block, a contracting brake of the lifting motor is opened, passive vibration reduction is realized due to flexibility of the independent suspension based on the spring, and the active vibration reduction and the passive vibration reduction form a rigid-flexible coupling vibration reduction structure.

10. The gravity-based closing series-parallel connection supporting leg according to claim 7, wherein in the active differential motion, a differential gear train comprises a first bevel gear fixedly connected with the first wheel, a second bevel gear fixedly connected with the second wheel, and a planetary bevel gear engaged with the first bevel gear and the second bevel gear, a large bevel gear, a driving bevel gear and a planetary carrier; the planetary bevel gear is hinged on a planetary carrier that is fixedly connected with the large bevel gear; the large bevel gear is rotationally connected with the wheel seat, and is driven by a driving bevel gear engaged with the large bevel gear; the driving bevel gear is fixedly connected with an output shaft of the walking single motor; and the lifting table is also provided with an angle sensor that is used to detect a rotation angle between the steering frame and the lifting table.

* * * * *